United States Patent [19]

Nakao

[11] Patent Number: 5,719,517
[45] Date of Patent: Feb. 17, 1998

[54] CLOCK GENERATING CIRCUIT FOR DIGITAL CIRCUIT OPERATING IN SYNCHRONISM WITH CLOCK, SEMICONDUCTOR INTEGRATED CIRCUIT INCLUDING THEM, AND LOGICAL GATE USED FOR THEM

[75] Inventor: Yuichi Nakao, Itami, Japan

[73] Assignee: Mitsubishi Denki Kabushiki Kaisha, Tokyo, Japan

[21] Appl. No.: 612,205

[22] Filed: Mar. 7, 1996

Related U.S. Application Data

[63] Continuation of Ser. No. 265,873, Jun. 27, 1994, abandoned.

[30] Foreign Application Priority Data

Jun. 29, 1993 [JP] Japan ................................. 5-158828
Jun. 29, 1993 [JP] Japan ................................. 5-158829

[51] Int. Cl.$^6$ .................................................. H03B 5/06
[52] U.S. Cl. .................................. 327/291; 327/298
[58] Field of Search ............................... 327/291, 293, 327/294, 298, 299, 141–144, 146, 172, 198

[56] References Cited

U.S. PATENT DOCUMENTS 4,518,865  5/1985  Iwasaki ........................ 327/198
4,641,044  2/1987  Shiraishi ....................... 327/291
4,736,162  4/1988  Ishihara ........................ 327/291
4,886,983  12/1989  Taka ............................ 327/142
5,151,613  9/1992  Satou et al. .................. 327/298

FOREIGN PATENT DOCUMENTS 56-33899    4/1981  Japan.
62-132405   6/1987  Japan.
63-202103   8/1988  Japan.
4-40005     2/1992  Japan.
5-53678     3/1993  Japan.

Primary Examiner—Timothy P. Callahan
Assistant Examiner—T. T. Lam
Attorney, Agent, or Firm—Lowe, Price, LeBlanc & Becker

[57] ABSTRACT

An oscillation stop signal holding latch 3 which stores a value deciding significant/unsignificant of an oscillation stop signal 4, and a NOR gate 21 which controls, when the oscillation stop signal 4 is significant, to stop the generation of a clock signal 7 and controls, when a predetermined signal is inputted from an input terminal 1 of an external signal in the abovementioned states with the oscillation stop signal being unsignificant, to resume the generation of the clock signal 7, and further a sampling circuit 10 between the input terminal 1 of the external signal and the oscillation stop signal holding latch 3 are provided. And a gate circuit 30 which forcibly makes the oscillation stop signal 4 become unsignificant so as to generate the clock signal 7 when the input signal from the input terminal 1 of the external signal is significant is provided. This enables the sampling circuit 10 to sample the input signal from the input terminal 1 of the external signal.

18 Claims, 15 Drawing Sheets

CLOCK GENERATING CIRCUIT FOR DIGITAL CIRCUIT OPERATING IN SYNCHRONISM WITH CLOCK, SEMICONDUCTOR INTEGRATED CIRCUIT INCLUDING THEM, AND LOGICAL GATE USED FOR THEM

This application is a continuation of application Ser. No. 08/265,873 filed Jun. 27, 1994 now abandoned.

BACKGROUND OF THE INVENTION

1. Field of the Invention

This present invention relates to a clock generating circuit, particularly to a clock generating circuit for a digital circuit such as microcontroller, microprocessor, or the like operating in synchronism with clock, specifically to a clock generating circuit for a digital circuit capable of reducing electric power consumption by stopping clock, and further to a semiconductor integrated circuit including them. And the invention also relates to a logical gate used for them.

2. Description of Related Art

In a digital circuit synchronizing with clock such as a microcontroller or the like configured as a semidonductor integrated circuit by integrating MOS transistors, the consumed electric current greatly depends upon the frequency of the dock signal. Generally, when a configuration called CMOS static circuit is adopted, the consumed electric current increases in proportion to the clock frequency however, only a small quantity of leakage current is consumed in the state where clock is stopped. By utilizing this characteristic, a microcontroller having a clock stop mode capable of stopping clock signal in the period when there is no need of signal processing operation has been put to practical use in order to reduce electric current to be consumed.

As to such a clock stop mode usually having been used conventionally in a microcontroller which builds in a clock generating circuit for generating clock, its state transfers to the clock stop mode by executing a specific instruction. Under the clock stop mode, though clock oscillation is stopped, when input from outside the circuit, a reset signal, an interrupt signal or the like, for example, is inputted, generally the clock stop mode is released and the clock oscillation is resumed.

In FIG. 1, a circuit configuration of a conventional clock generating circuit built in a microcontroller as an example of a digital circuit constructed on a one-chip semiconductor integrated circuit.

In FIG. 1, the area surrounded by a dashed line designated by reference numeral 100 shows a one-chip semiconductor integrated circuit whereon a microcontroller as a digital circuit is configured by a semiconductor integrating technique. But in FIG. 1, the circuit configuration of the microcontroller itself is omitted.

In FIG. 1, reference numeral 1 designates an interrupt input terminal to which an interrupt signal is inputted from the outside of the semiconductor integrated circuit 100. The interrupt signal inputted to the interrupt input terminal 1 is inputted to a noise canceller circuit 40 as an interrupt input signal 2 through a buffer.

The noise canceller 40 is composed of a resistance element 41 to whose one end the interrupt input signal 2 is inputted, a Schmitt trigger type buffer 43 whose input end is connected to the other end of the resistance element 41, and a capacity element 42 whose one end is connected to a portion between the other end of the resistance element 41 and the input end of the Schmitt trigger type buffer 43, and the other end thereof is grounded.

Reference numeral 3 designates an oscillation stop signal holding latch. To the reset input terminal R of the latch 3, the output signal 18 of the aforementioned noise canceller circuit 40, more specifically, the output signal of the Schmitt trigger type buffer 43 is inputted, and to the set input terminal S thereof, an oscillation stop mode setting signal 5 is inputted. The oscillation stop signal holding latch 3, when the oscillation stop mode setting signal 5 of "H" level is inputted to the set input terminal S, is set and outputs a signal of "H" level from the output terminal Q, and when the output signal 18 of "H" level of the noise canceller circuit 40 is inputted to the reset input terminal R, is reset and outputs a signal of "L" level from the output terminal Q.

In addition, the output signal from the output terminal Q of the oscillation stop signal holding latch 3 is given to an oscillation circuit 20 as an oscillation stop signal 4.

The oscillation circuit 20 is composed of a NOR gate 21 of two-inputs, a resistance element 22, and a resonator 23. To one input terminal of the NOR gate 21, the aforementioned oscillation stop signal 4 is inputted. And the resistance element 22 and the resonator 23 are connected in parallel to each other. The one end of the both is connected to the other input terminal of the NOR gate 21, and the other end of the both is connected to the output terminal of the NOR gate 21. An output signal 24 of the NOR gate 21, that is, an output signal of the oscillation circuit 20 is supplied as a clock signal 7 through a buffer to a microcontroller as a digital circuit configured on the semiconductor integrated circuit 100.

In addition, since it is not advisable that the resistance element 22 and the resonator 23 among the components of the oscillation circuit 20 shown in FIG. 1 are integrated on the semiconductor integrated circuit 100, they are usually provided outside of the semiconductor integrated circuit 100 as simple substances. Usually such a configuration that the parallel circuit of the resistance element 22 and the resonator 23 is connected to the semiconductor integrated circuit 100 through an input terminal 101 and an output terminal 102 is adopted.

And the oscillation stop mode setting signal 5 is generated at need by the microcontroller configured as the semiconductor integrated circuit 100.

Next, explanation will be made on the conventional clock generating circuit including the oscillation circuit 20 shown in FIG. 1. But, in the following explanation, all of the interrupt input signal 2, oscillation stop signal 4 and oscillation stop mode setting signal 5 are in "H" level active (positive logic).

The NOR gate 21 of the oscillation circuit 20 outputs, when the oscillation stop signal 4 inputted to one input terminal thereof is negated (in "L" level), an inverted signal of the signal given to the other input terminal from the input terminal 101. However an output signal 24 of the NOR gate 21 has circuit delay for the input signal to the other input terminal. The output signal 24 of the NOR gate 21 is inputted to the other input terminal of the NOR gate 21 again through the output terminal 102, the resonator 23 and the input terminal 101. At this time, the resonator 23 functions as a band pass filter, which weakens the component other than component of resonance frequency of a signal waveform outputted from the NOR gate 21 to the output terminal 102 and outputs it to the input terminal 101. As the result, oscillation is continued in the vicinity of the resonance frequency, and is supplied into the semiconductor tegrated circuit 100 as a clock signal 7.

By the way, in the oscillation circuit 20 of such a clock generating circuit as aforementioned, the transition from the oscillation state to the oscillation stop state is performed as follows. In this case, however, the interrupt input signal 2 is kept in the negated state, that is, "L" level.

When the microcontroller configured on the semiconductor integrated circuit 100 executes a specific instruction, the oscillation stop mode setting signal 5 is asserted (becomes in "H" level). As aforementioned, since the oscillation stop mode setting signal 5 is given to the set input terminal S of the oscillation stop signal holding latch 3, the oscillation stop signal holding latch 3 is set by the fact that the oscillation stop mode setting signal 5 is asserted, and the oscillation stop signal 4 which is the output signal from the output terminal Q of the latch 3 is asserted (becomes in "H" level). The oscillation stop signal 4 is inputted to one input terminal of the NOR gate 21 of the oscillation circuit 20. Accordingly, since the output signal 24 of the NOR gate 21 turns to "L" level and maintains the state, the oscillation circuit 20 stops the oscillation.

On the other hand, in such oscillation circuit 20 as aforementioned, the release from the oscillation stop state, in other words, the return to the oscillation state is performed as follows.

When an interrupt signal of "H" level is inputted from outside to the input terminal 1 of the semiconductor integrated circuit 100, the interrupt input signal 2 is asserted (becomes in "H" level). The interrupt input signal 2 is inputted to the reset input R of the oscillation stop signal holding latch 3 through the noise canceller circuit 40 as the output signal 18 of the circuit 40. Therefore, when the interrupt input signal 2 is asserted, the oscillation stop signal holding latch 3 is reset, and the oscillation stop signal 4 which is the output signal from the output terminal Q is negated (becomes in "L" level).

The oscillation stop signal 4 is inputted to one input terminal of the NOR gate 21 of the oscillation circuit 20. Therefore, since the output signal 24 of the NOR gate 21 becomes in the state where an input signal to the other input terminal is outputted intact, the oscillation circuit 20 resumes to oscillate again.

By the way, to a portion between the interrupt input terminal 1 and the oscillation stop signal holding latch 3, the noise canceller circuit 40 is connected. The noise canceller circuit 40 has a time constant determined by the resistance element 41 and the capacity element 42 which are the components thereof. Therefore, in the case where the "H" level pulse width of the interrupt input signal 2 which is the input signal to the noise canceller circuit 40 is shorter than the time constant of the noise canceller circuit 40, change does not appear in the output signal 18 of the noise canceller circuit 40. This is a countermeasure to avoid that the oscillation stop signal holding latch 3 is set by a noise of short width to make the oscillation circuit 20 oscillate again, and to improve the noise resistance of the microcontroller.

The conventional noise canceller circuit 40 is constructed so that, for example, as aforementioned, noise is removed utilizing the time constant determined by the resistance element 41 and the capacity element 42 so as not to make change appear in the output signal 18. Therefore, in order to improve the resistance to a noise of longer width, the time constant of the noise canceller circuit 40 should be larger. However, in that case, it is necessary to integrate the capacity elements 42 of large-size on the semiconductor integrated circuit 100. But basically, it is not economical to integrate such capacity elements 42 of large size on the semiconductor integrated circuit 100. Further, for the reason that the time constant determined by the resistance element 41 and the capacity element 42 varies widely depending on the production condition in integrating the elements 41 and 42 on the semiconductor 100 or on the use condition after that, it is actually impossible to strictly set the noise width which is to be canceled.

SUMMARY OF THE INVENTION

The present invention has been devised in order to solve the aforementioned problems, and the object thereof is to provide a clock generating circuit supplying clock to a digital circuit operating in synchronism with the clock and having an oscillation stop function, and also having a high reliability used for digital circuit by making the width of a noise to be removed of the external signal input which resumes the oscillation of the oscillation circuit larger easily, and by setting a noise width to be canceled strictly and easily regardless of the production condition or use condition.

Also, the present invention is to provide a semiconductor integrated circuit including such a digital circuit and a clock generating circuit.

Further, the present invention is to provide a logical gate which makes their operation become sure.

The clock generating circuit of the invention comprises storing means for storing a valve which determines significant/unsignificant of an oscillation stop signal, and has a clock stop function such that generation of a clock signal is stopped when the oscillation stop signal is significant and is resumed when the oscillation stop signal is unsignificant by, in the abovementioned state, being inputted predetermined signal from an input terminal of an external signal, and further comprises a sampling circuit for the external signal inputted from the input terminal. The sampling circuit samples the external signal inputted from the input terminal. When the sampling result is significant over more than a predetermined number of clocks of the clock signal, the sampling circuit changes the stored content of the aforementioned storing means so that the oscillation stop signal becomes unsignificant. The clock generating circuit of the invention is provided with gate means for generating a clock signal by forcibly making the oscillation stop signal unsignificant when the external signal inputted from the input terminal is significant.

And a digital circuit of the invention is provided with such a clock generating circuit.

Further, a semiconductor integrated circuit of the invention is provided such clock generating circuit and digital circuit.

Furthermore, the logical gate of the invention is provided with a first and a second P channel transistors connected in series between a first power source terminal and an output terminal and with a first and a second N channel transistors connected in series between a second power source terminal and an output terminal. The gate electrode of the first P channel transistor is connected to a second input terminal, the gate electrode of the second P channel transistor is connected to a first input terminal or an output of an inverter, the gate electrode of the first N channel transistor is connected to the second input terminal, and the gate electrode of the second N channel transistor is connected to the output of the inverter or to the first input terminal. Further, the logical gate of the invention is provided with a MOS transistor for fixing output level whose source electrode is connected to the first or second power source terminal, drain electrode is connected to the output terminal, and gate electrode is connected to the first input terminal or to the output of the inverter.

In the clock generating circuit of the invention, when the external input signal becomes significant, clock signal is generated. This enables the sampling means to sample the external input signal. In the case where this sampling result is significant over a predetermined number of times, the stored content of the storing means which stores a value deciding significant/unsignificant of the oscillation stop signal is made unsignificant. Therefore, the pulse width of a noise to be removed of the external input signal can be set precisely in a width of a magnification of the clock period, and the removal of a noise of a larger width can be done easily.

In addition, in order to sample the pulse width of the external input signal by clock, it is necessary that the clock signal is being generated. Therefore, the oscillation stop signal is made unsignificant by the gate means when the external input signal becomes significant and the clock signal is generated immediately only while the external input signal is significant.

And in the digital circuit of the invention, when it does not operate in synchronism with clock, besides clock oscillation is stopped so as to reduce current to be consumed, noise resistance is improved.

Further, in the semiconductor integrated circuit of the invention, such clock generating circuits and digital circuits are configured by integrating on one-chip.

Furthermore, in the logical gate of the invention, when the control signal is at a first level or second level, the MOS transistor for fixing output potential turns ON and the output signal is fixed forcibly at the second level or first level.

The above and further objects and features of the invention will more fully be apparent from the following detailed description with accompanying drawings.

DESCRIPTION OF THE PREFERRED EMBODIMENTS

In the following, explanation will be made in detail referring to drawings showing the embodiments thereof.

Figure 2:
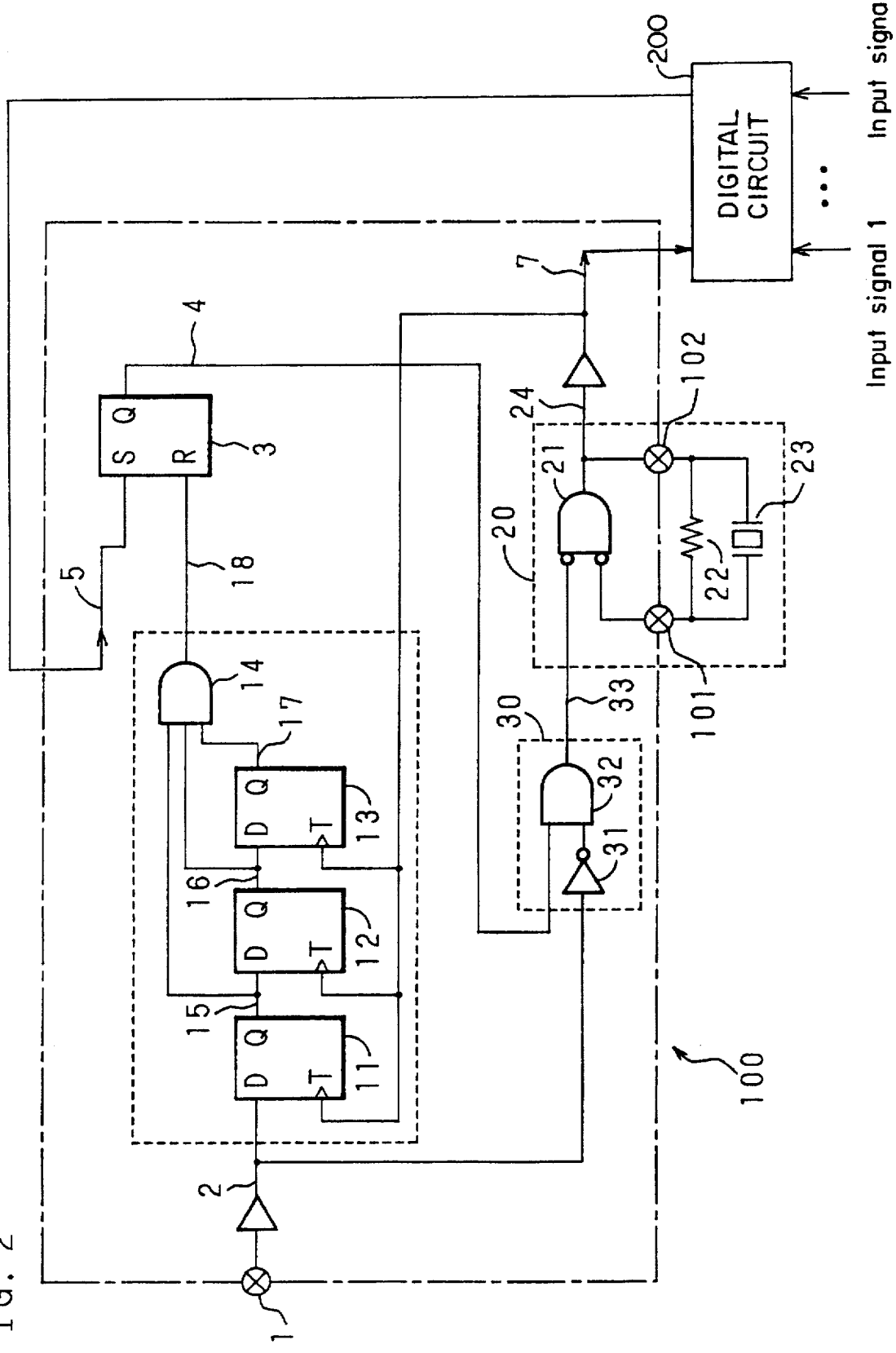
FIG. 2 is a circuit diagram showing a configuration example of one embodiment of a clock generating circuit for digital circuit of the invention and a semiconductor integrated circuit including it.

In a circuit diagram in FIG. 2, circuit configuration of the clock generating circuit of the invention built in a microcontroller as an example of a digital circuit configured on one-chip semiconductor integrated circuit.

In FIG. 2, the area surrounded by a dashed line designated by reference numeral 100 shows one-chip semiconductor integrated circuit. On this one chip, a microcontroller as a digital circuit 200 is configured by a semiconductor integrating technique.

Figure 1:
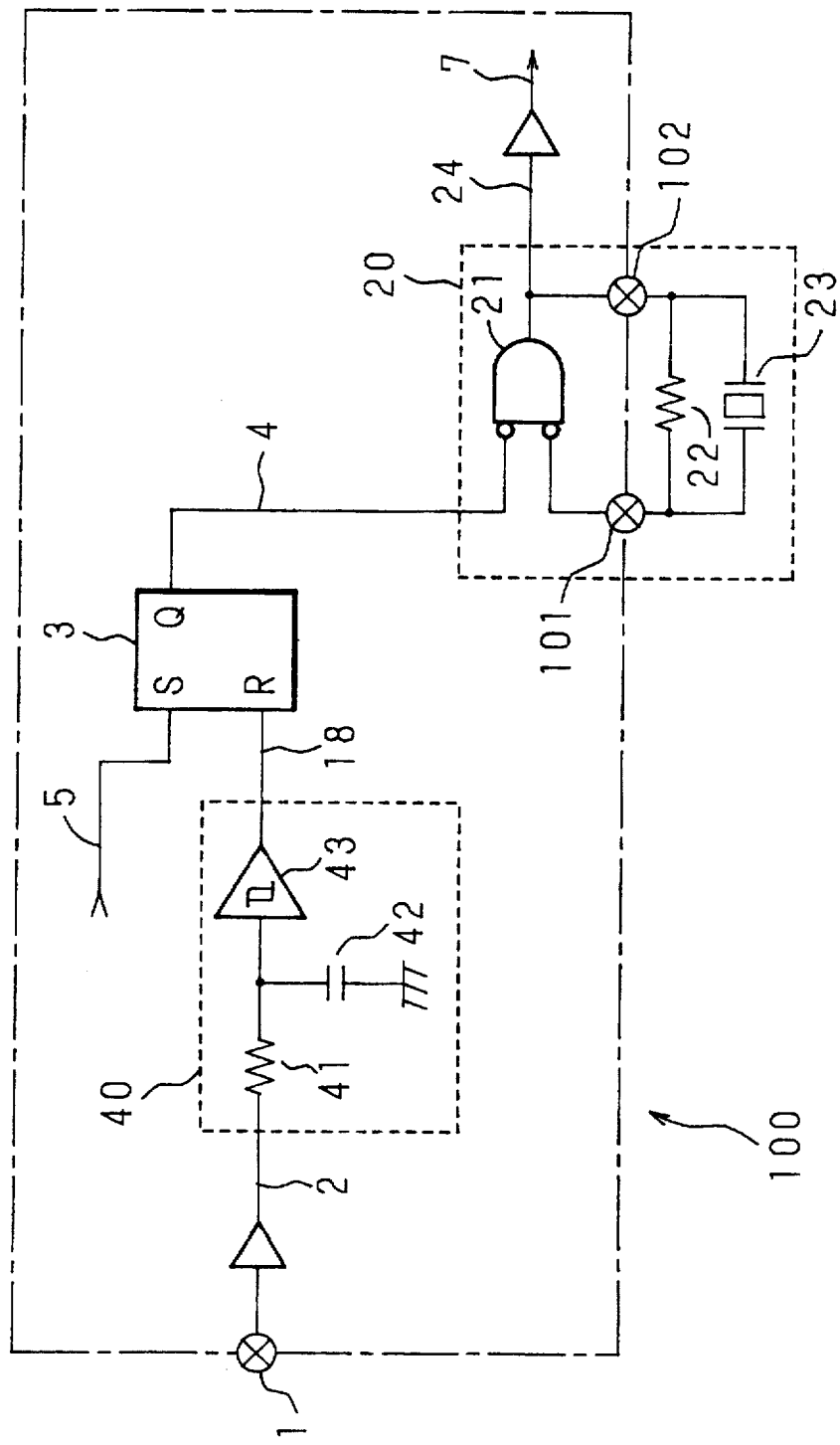
FIG. 1 is a circuit diagram showing a configuration example of a clock generating circuit for conventional digital circuit.

In addition, in FIG. 2, the reference characters same as those in FIG. 1 referred to in the explanation of the aforementioned conventional example show the same or corresponding parts.

In FIG. 2, reference numeral 1 designates an interrupt input terminal to which an interrupt signal is inputted from the outside of the semiconductor integrated circuit 100. The interrupt signal inputted to the interrupt input terminal 1 is inputted to a sampling circuit 10 and a gate circuit 30 through a buffer as an interrupt input signal 2.

The sampling circuit 10 is, to be described later though, mainly composed of D-flops 11, 12 and 13 which are cascade-connected in three stages and an AND gate 14 of three-input in this embodiment.

Numeral 3 designates an oscillation stop signal holding latch. To the reset input terminal R, a clock resuming signal 18 which is an output signal of the aforementioned sampling circuit 10, more specifically, an output signal of the AND gate 14 is inputted, and to the set input terminal S, an oscillation stop mode setting signal 5 is inputted. The oscillation stop signal holding latch 3, when an oscillation stop mode setting signal 5 of "H" level is inputted to the set input terminal S, is set and outputs a signal of "H" level from the output terminal Q, and when the clock resuming signal 18 of "H" level which is the output signal of the sampling circuit 10 is inputted to the reset input terminal R, is set and outputs a signal of "L" level from the output terminal Q.

In addition, the output signal from the output terminal Q of the oscillation stop signal holding latch 3 is given to the gate circuit 30 as an oscillation stop signal 4.

The gate circuit 30 is mainly composed of an inverter 31 and an AND gate 32 of two-input. To the input end of the inverter 31, the interrupt input signal 2 is inputted through the buffer from the interrupt input terminal 1. To the AND gate 32, the output signal of the inverter 31 and the aforementioned oscillation stop signal 4 are inputted. And the output signal of the AND gate 32 is given to an oscillation circuit 20 to be described later as an output signal 33 of the gate circuit 30.

The oscillation circuit 20 is mainly composed of a NOR gate 21 of two-input, a resistance element 22, and a resonator 23. To one input terminal of the NOR gate 21, the output signal 33 of the aforementioned gate circuit 30 is inputted. The resistance element 22 and the resonator 23 are connected in parallel to each other. One end of the both is connected to the other input terminal of the NOR gate 21 and the other input of the both is connected to the output terminal of the NOR gate 21. The output signal 24 of the NOR gate 21, that is, the output signal 24 of the oscillation circuit 20 is supplied to a semiconductor integrated circuit 100 as a clock signal 7 through a buffer as well as supplied to trigger terminals T of the D-flip flops 11, 12 and 13 in the aforementioned sampling circuit 10.

In addition, since it is not advisable that the resistance element 22 and resonator 23 among the components of the oscillation circuit 20 shown in FIG. 2 are integrated on the semiconductor circuit 100, they are usually provided as simple substances outside the semiconductor integrated circuit 100. And usually such a configuration that the parallel circuit of the resistance element 22 and the resonator 23 is connected to the semiconductor integrated circuit 100 through an input terminal 101 and the output terminal 102 is adopted.

And an oscillation stop mode setting signal 5 is generated at need by a microcontroller configured as the semiconductor integrated circuit 100.

Here, explanation will be given on the sampling circuit 10 and the gate circuit 30 which are characteristic of the invention.

As aforementioned, the sampling circuit 10 is mainly composed of the D-flip flops 11, 12 and 13 cascade-connected in three stages and the AND gate 14 of three-input.

To a data input terminal D of the D-flip flop 11 of the first stage, the interrupt input signal 2 is inputted, and the output signal 15 from the output terminal Q is given to the first input terminal of the AND gate 14 and a data input terminal D of the D-flip flop 12 of the second stage.

To the data input terminal D of the D-flip flop 12 of the second stage, the output signal 15 of the D-flip flop 11 of the first stage is inputted as aforementioned, and the output signal 16 from the output terminal Q is given to the second input terminal of the AND gate 14 and to a data input terminal D of the D-flip flop 13 of the third stage.

To the data input terminal D of the D-flip flop 13 of the third stage, the output signal 16 of the D-flip flop 12 in the second stage is inputted as aforementioned, and the output signal 17 from the output terminal Q is given to the third input terminal of the AND gate 14.

To the trigger input terminals T of the respective D-flip flops 11, 12 and 13, the clock signal 7 which is the output signal of the oscillation circuit 20 is inputted in common.

Operations of such the sampling circuit 10 is as follows.

The D-flip flop 11 of the first stage samples the interrupt input signal 2 at the rising timing point of the clock signal 7 from "L" level to "H" level, in other words, latches the level of the interrupt input signal 7, and outputs it from the output terminal Q as the output signal 15. The D-flip flop 12 of the second stage samples the output signal 15 of the D-flip flop 11 of the first stage at the rising timing point of the clock signal 7 from "L" level to "H" level, in other words, latches the level of the output signal 15 of the D-flip flop 11 and outputs it from the output terminal Q as the output signal 16. Further, the D-flip flop 13 of the third stage samples the output signal 16 of the D-flip flop 12 of the second stage at the rising timing point of the clock signal 7 from "L" level to "H" level, in other words, latches the level of the output signal 16 of the D-flip flop 12 and outputs it from the output terminal Q as the output signal 17.

Accordingly, when the oscillation circuit 20 is in the oscillation state and the interrupt input signal 2 keeps "H" level over the time of three clocks of the clock 7, all of the output signals 15, 16 and 17 of the respective D-flip flops 11, 12 and 13 become in "H" level. This means that all of the three inputs of the AND gate 14 becomes in "H" level. Therefore the output signal of the AND gate 14, that is, the clock resuming signal 18 which is the output signal of the sampling circuit 10 becomes also in "H" level, and the oscillation stop signal holding latch 3 is reset.

In other words, when the oscillation circuit 20 is in the oscillation state and the interrupt input signal 2 keeps "H" level over the time of three clocks of the clock signal 7, the oscillation stop signal 4 is negated. To the contrary, even when the oscillation circuit 20 becomes once in the state of oscillation, such a condition that all of the output signals 15, 16 and 17 of the D-flip flops 11, 12 and 13 of the sampling circuit 10 become in "H" level is not satisfied when the interrupt input signal 2 returns to "L" level until the time of three clocks of the clock signal 7 passes over, and since the oscillation circuit 20 also stops oscillating, the oscillation stop signal 4 is not to be negated.

By the way, in order that the operation of the aforementioned sampling circuit 10 is possible, it must become in the oscillation state in spite of that the oscillation stop signal 4 is asserted and the oscillation circuit 20 is in the oscillation stop state. In order to satisfy such a necessity, the gate circuit 30 is provided.

That is, usually, the oscillation stop signal 4 is asserted in the state where the interrupt input signal 2 is negated. Thereby, both of the inputs to the two input terminals of the AND gate 32 of the gate circuit 30 become in "H" level and the output signal 33 thereof also becomes in "H" level, and as aforementioned, the oscillation circuit 20 stops oscillation operation. But in the state where the oscillation circuit 20 stops oscillating, when an "H" level pulse of the interrupt input signal 2 is inputted from the interrupt input terminal 1, it is inverted by the inverter 31 and a signal of "L" level is inputted to the other input terminal of the AND gate 32. Therefore, the output signal 33 of the AND gate 32 becomes in "L" level. This leads the oscillation circuit 20 to resume the oscillation.

But, since the oscillation of the oscillation circuit 20 in this case is performed only in the period when the interrupt input signal 2 is in "H" level, when a short width noise is contaminated into the interrupt input signal 2, the oscillation of the oscillation circuit 20 finishes in a relatively short period, for example, in a period of one clock or two clocks of the clock signal 7.

Next, explanation will be made on the operation of the clock generating circuit of the invention whose one embodiment is shown in the circuit diagram in FIG. 2 referring to the waveform chart in FIG. 3.

But, in the following explanation, all of the interrupt input signal 2, the oscillation stop signal 4, the oscillation stop mode setting signal 5 and the output signal 33 of the gate circuit 30 are assumed to be in "H" level active (positive logic).

The NOR gate 21 of the oscillation circuit 20 outputs an inverted signal of a signal given from the input terminal 101 to the other input terminal thereof as an output signal 24, when the output signal 33 of the gate circuit 30, which is inputted to one input terminal of the NOR gate 21, is negated (becomes in "L" level). The output signal of the NOR gate 21 has a circuit delay with respect to the input signal inputted to the input terminal of the NOR gate 21. The output signal of the NOR gate 21 is inputted again to the other input terminal of the NOR gate 21 through the output terminal 102 and resonator 23 and the input terminal 101. At this time, the resonator 23 functions as a band pass filter, and weakens component other than that of resonance frequency of a signal waveform outputted from the NOR gate 21 to the output terminal 102 to output it to the input terminal 101. As the result, oscillation is continued in the vicinity of the resonance frequency of the resonator 23, and is supplied into the semiconductor integrated circuit 100 a the clock signal 7, and is also supplied to the trigger input terminals T of the respective D-flip flops 11, 12 and 13 of the sampling circuit 10.

By the way, the transition from the oscillation state to the oscillation stop state of the aforementioned oscillation circuit 20 is performed as follows. In this case, the interrupt input signal 2 is kept in the negated state, that is, "L" level.

When the microcontroller configured on the semiconductor integrated circuit 100 executes a specific instruction, the oscillation stop mode setting signal 5 is asserted (becomes in "H" level). Now, for example, it is assumed that the oscillation stop mode setting signal 5 is assested at the timing T1 shown in FIG. 3.

As aforementioned, since the oscillation stop mode setting signal 5 is connected to the set input terminal S of the oscillation stop signal holding latch 3, the oscillation stop signal holding latch 3 is set by assertion of the oscillation stop mode setting signal 5, and the oscillation stop signal 4 which is the output signal from the output terminal Q is asserted (becomes in "H" level).

Since the oscillation stop signal 4 is inputted to one input terminal of the AND gate 32 of the gate circuit 30 and the interrupt input signal 2 which is inputted to the other input terminal of the AND gate 32 through the inverter 31 is negated, the output signal of the AND gate 32, that is, the output signal 33 of the gate circuit 30 is also asserted by assertion of the oscillation stop signal 4. Since the output signal 33 of the gate circuit 30 is inputted to one input terminal of the NOR gate 21 of the oscillation circuit 20, the oscillation circuit 20 stops oscillating.

On the other hand, in the aforementioned oscillation circuit 20, release from the oscillation stop state, in other words, return to the oscillation state is performed as follows.

When an interrupt signal of "H" level is inputted from outside to the input terminal 1 of the semiconductor integrated circuit 100, the interrupt input signal 2 is asserted (becomes in "H" level). Now, for example, it is assumed that an interrupt signal of "H" level is inputted to the interrupt input terminal 1 at the timing T2 shown in FIG. 3.

When an interrupt signal of "H" level is inputted to the interrupt input terminal 1, the interrupt input signal 2 is asserted. Since the interrupt input signal 2 is inputted to the inverter 31 of the gate circuit 30, the output signal 33 of the gate circuit 30 is negated regardless of the oscillation stop signal 4. Since the output signal 33 of the gate circuit 30 is inputted to the control input terminal of the oscillation circuit 20, the oscillation circuit 20 resumes the oscillation. Thereby, pulse begins to appear in the clock signal 7.

When pulse begins to appear in the clock signal 7, the D-flip flop 11 of the first stage samples the interrupt input signal 2 and outputs the output signal 15 of the same level ("H" level) from the output terminal Q at the timing T3 by that the first pulse P1 is given to the trigger input terminal T of the D-flip flop 11 of the first stage of the sampling circuit 10.

By that the next pulse P2 is given to the trigger input terminal T of the D-flip flop 12 of the second stage of the sampling circuit 10, the D-flip flop 12 of the second stage samples the output signal 15 of the D-flip flop 11 of the first stage and outputs the output signal 16 of the same level ("H" level) at the timing T4.

Further, by that the next pulse is given to the trigger input terminal of the D-flip flop 13 of the third stage of the sampling circuit 10, the D-flip flop 13 of the third stage samples the output signal 16 of the D-flip flop 12 of the second stage and outputs the output signal 17 of the same level ("H" level) at the timing T5.

By those aforementioned, since all of the input signals to the three input terminals of the AND gate 14 become in "H" level, the output therefrom, that is, the clock resuming signal 18 which is the output signal of the sampling circuit 10 becomes in "H" level after a little circuit delay from the timing T5. Thereby, the oscillation stop signal holding latch 3 is reset and the oscillation stop signal 4 is negated. This leads the output signal 33 of the gate circuit 30 to be negated, and the oscillation circuit 20 resumes oscillating.

In addition, after that, since the oscillation stop signal holding latch 3 is not to become in the set state as long as the oscillation stop mode setting signal 5 given to the set terminal S of the oscillation stop signal holding latch 3 is not asserted, the oscillation of the oscillation circuit 20 is continued stably.

By the way, in the embodiment shown in the circuit diagram of FIG. 2, unless the state where the interrupt input signal 2 is asserted is continued over a period in which pulse appears three times successively in the clock signal 7, the clock resuming signal 18 which is the output signal of the sampling circuit 10 does not become in "H" level. In other words, in the embodiment shown in FIG. 2, it is necessary to sample the interrupt input signal 2 of "H" level at the three D-flip flops 11, 12 and 13 by three successive pulses. This means, in other words, only by increasing or decreasing the number of stages of the D-flip flops of the sampling circuit 10, it is possible to set easily and precisely the pulse width of a noise to be canceled regardless of a production condition or a use condition.

Figure 4:
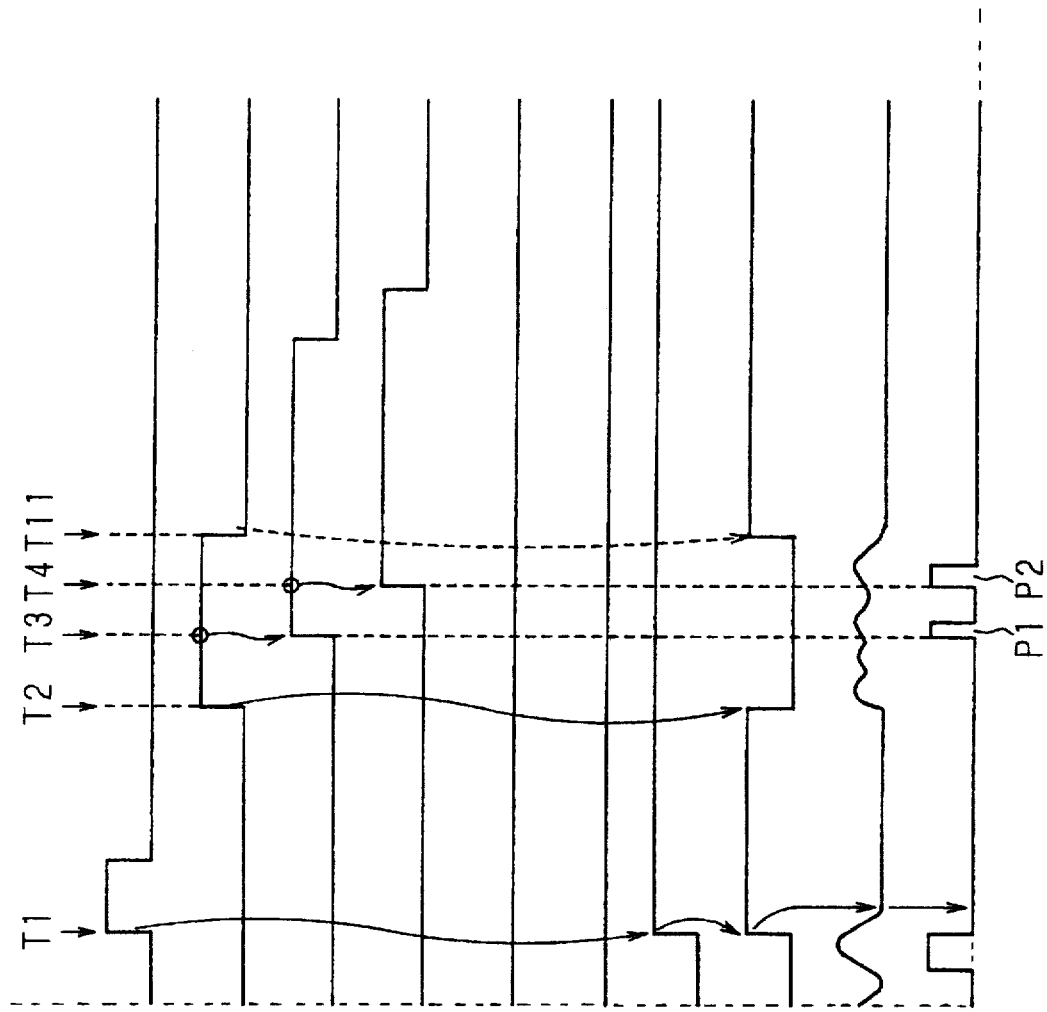
FIG. 4 is a waveform chart showing an operation of one embodiment of the invention.

On the other hand, when the pulse width of the interrupt signal, which is a noise, to be inputted to the interrupt input terminal i is shorter than that of the proper interrupt signal 2, such an operation as shown in the waveform chart of FIG. 4 is performed.

Figure 3:
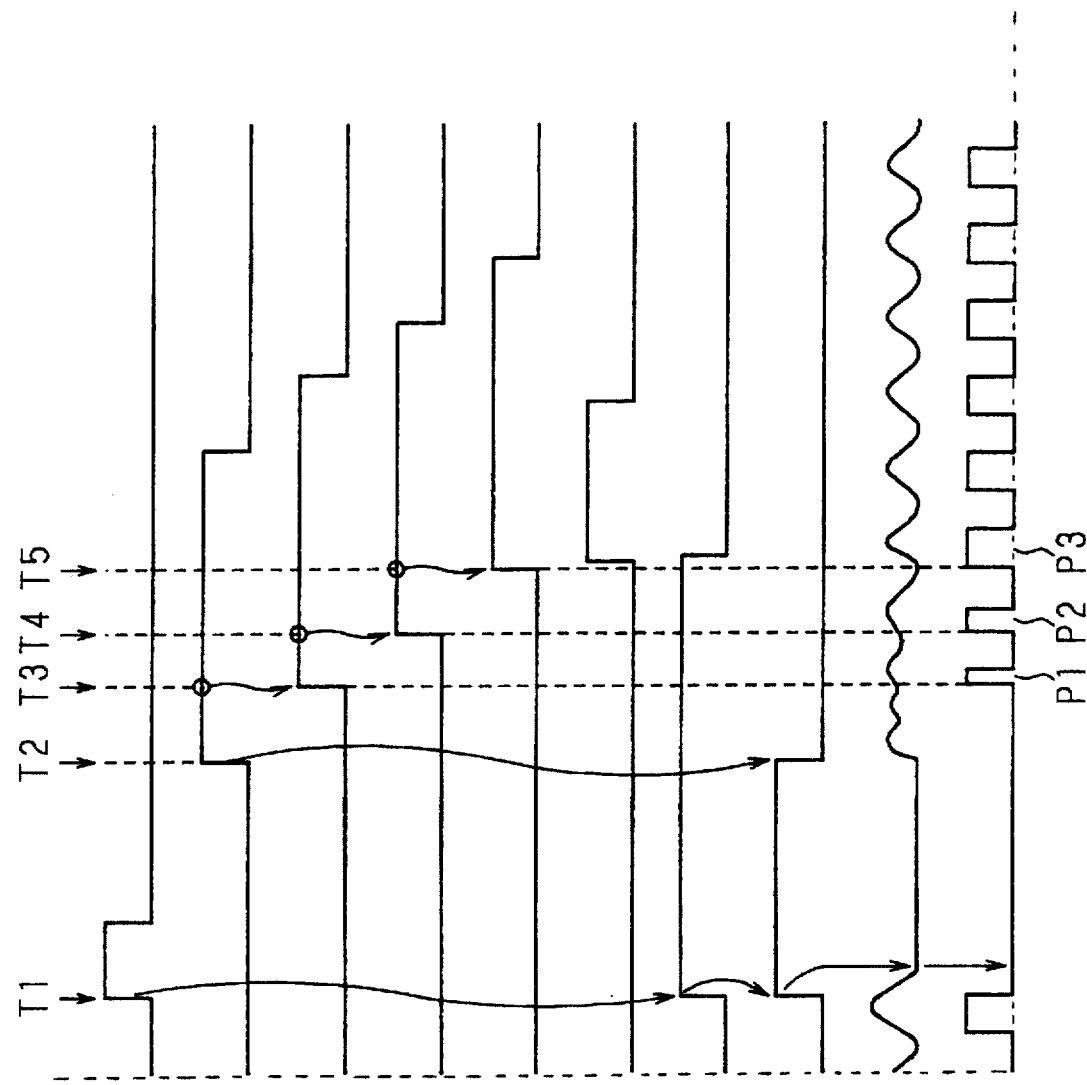
FIG. 3 is a waveform chart showing an operation of one embodiment of the invention.

For example, it is assumed that the interrupt signal inputted to the interrupt input terminal I becomes in "L" level at the timing T11 which is earlier than the asserting period of the proper interrupt input signal 2 after it becomes in "H" level temporarily at the timing T2 in FIG. 4, in the same way as the case of the waveform chart in FIG. 3.

In this case, in the same way as the aforementioned case of the waveform chart shown in FIG. 3, by that the interrupt input signal 2 is asserted into "H" level at the timing T2, the oscillation of the oscillation circuit 20 is once resumed and the pulses P1, P2 are generated successively to lead both of the output signals 15, 16 of the D-flip flops 11 and 12 of the first and second stages of the sampling circuit 10 to become in "H" level. But when the input signal to the interrupt input terminal 1 turns to "L" level at the timing T11 before the pulse P3 is outputted from the oscillation circuit 20 in the clock signal 7, the interrupt input signal 2 is also negated and becomes in "L" level. Thereby, the pulse P3 generated at the timing T5 of the waveform chart in FIG. 3 is not to be generated in an example shown in FIG. 4. Therefore, the output signal 17 of the D-flip flop 13 of the third stage of the sampling circuit 10 does not become in "H" level, but keeps "L" level continuously, and the clock resuming signal 18 which is the output signal of the sampling circuit 10 does not become in "H" level.

Therefore, since the oscillation stop signal holding latch 3 is not to be reset and the oscillation stop signal which is the output signal thereof also keeps the asserted state, the oscillation of the oscillation circuit 20 stops again after the timing T11 and pulse never appear in the clock signal 7.

Though the embodiment shown in the aforementioned circuit diagram of FIG. 2 is so configured that the oscillation of the oscillation circuit 20 is resumed by the interrupt signal inputted from the interrupt input terminal 1, it is obvious that the present invention can be adapted also to the case where the oscillation circuit 20 is released from the oscillation stop state by using the other various kinds of signals, for example, reset signal or the like.

Further, in the embodiment shown in the aforementioned circuit diagram of FIG. 2, though the number of the input signal to the semiconductor integrated circuit 100 is only one from the interrupt input terminal 1, it is obvious that the present invention can be adapted also in the case where there are a plurality of interrupt signals.

In the following, explanation will be given on the respective embodiment examples of the variations of the invention of such a case.

Figure 5:
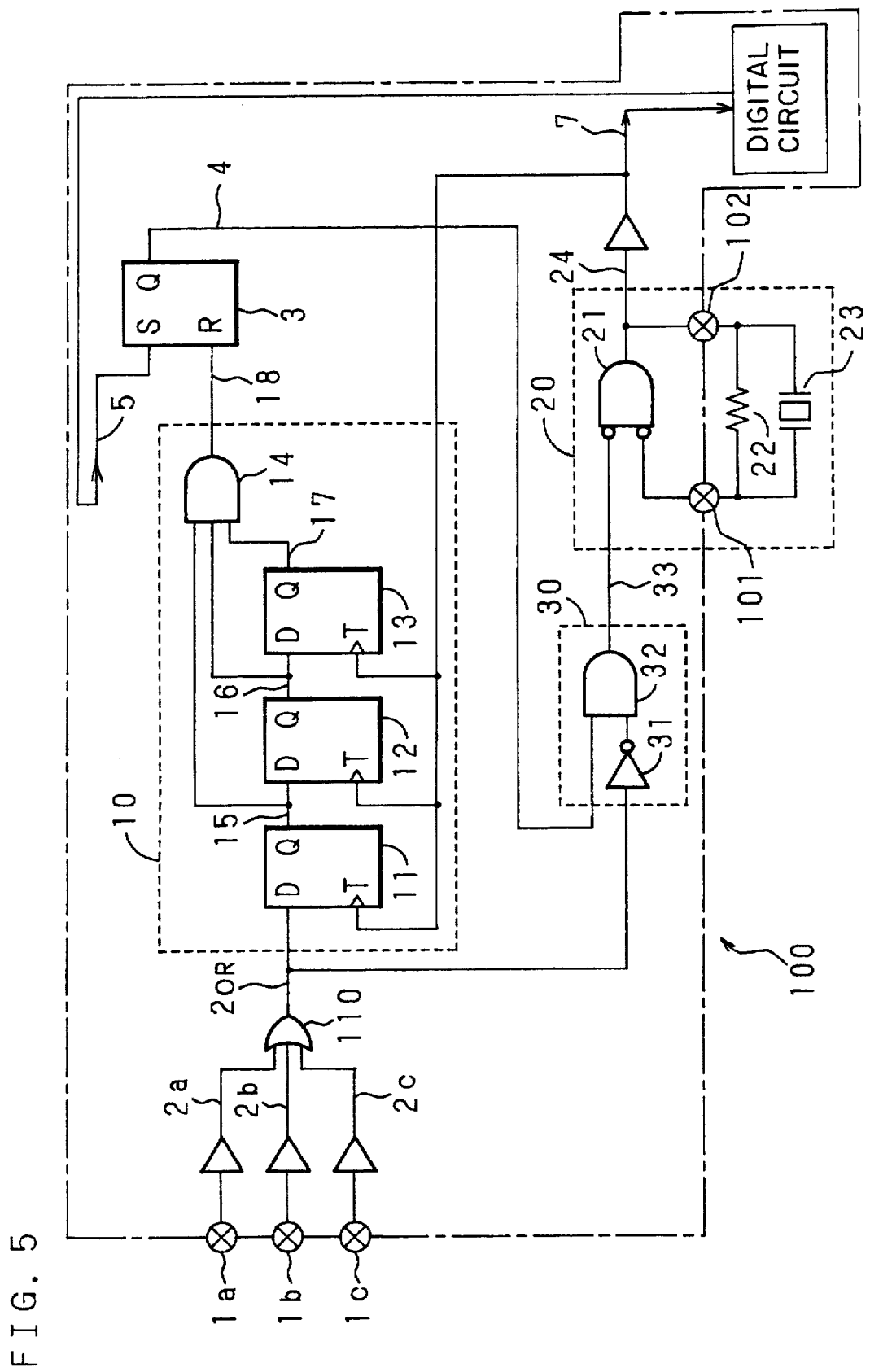
FIG. 5 is a circuit diagram showing a configuration example of another embodiment of a clock generating circuit for digital circuit of the invention and a semiconductor integrated circuit including it.

In a circuit diagram shown in FIG. 5 is an embodiment example configured so that a common noise removal width is set for a plurality of external input signals and one sampling circuit 10 is provided therein.

In FIG. 5, three interrupt input terminals 1a, 1b, 1c, which receive external input signals, are provided. The signals inputted respectively therefrom are inputted as the interrupt input signals 2a, 2b and 2c to an OR gate 110 of three inputs through the respective buffers. An output signal 2OR of the OR gate 110 is inputted to the data input terminal D of the D-flip flop 11 of the first stage of the sampling circuit 10 and to the input end of the inverter 31 of the gate circuit 30.

Since the configuration other than the aforementioned is same as that of the embodiment shown in FIG. 2, explanation will be omitted.

In the embodiment shown in FIG. 5, the same operation is performed to the signals inputted to any of the three interrupt input terminals 1a, 1b, 1c. That is, in the oscillation stop state, even when a signal of "H" level having a predetermined or more width is inputted to any of the three input terminals 1a, 1b, 1c, the clock resuming signal 18 which is the output signal of the sampling circuit 10 becomes in "H" level, and finally returns to the oscillation state. Even when a relatively short noise is inputted to any of the three interrupt input terminals 1a, 1b, 1c, it is canceled by the sampling circuit 10.

Figure 6:
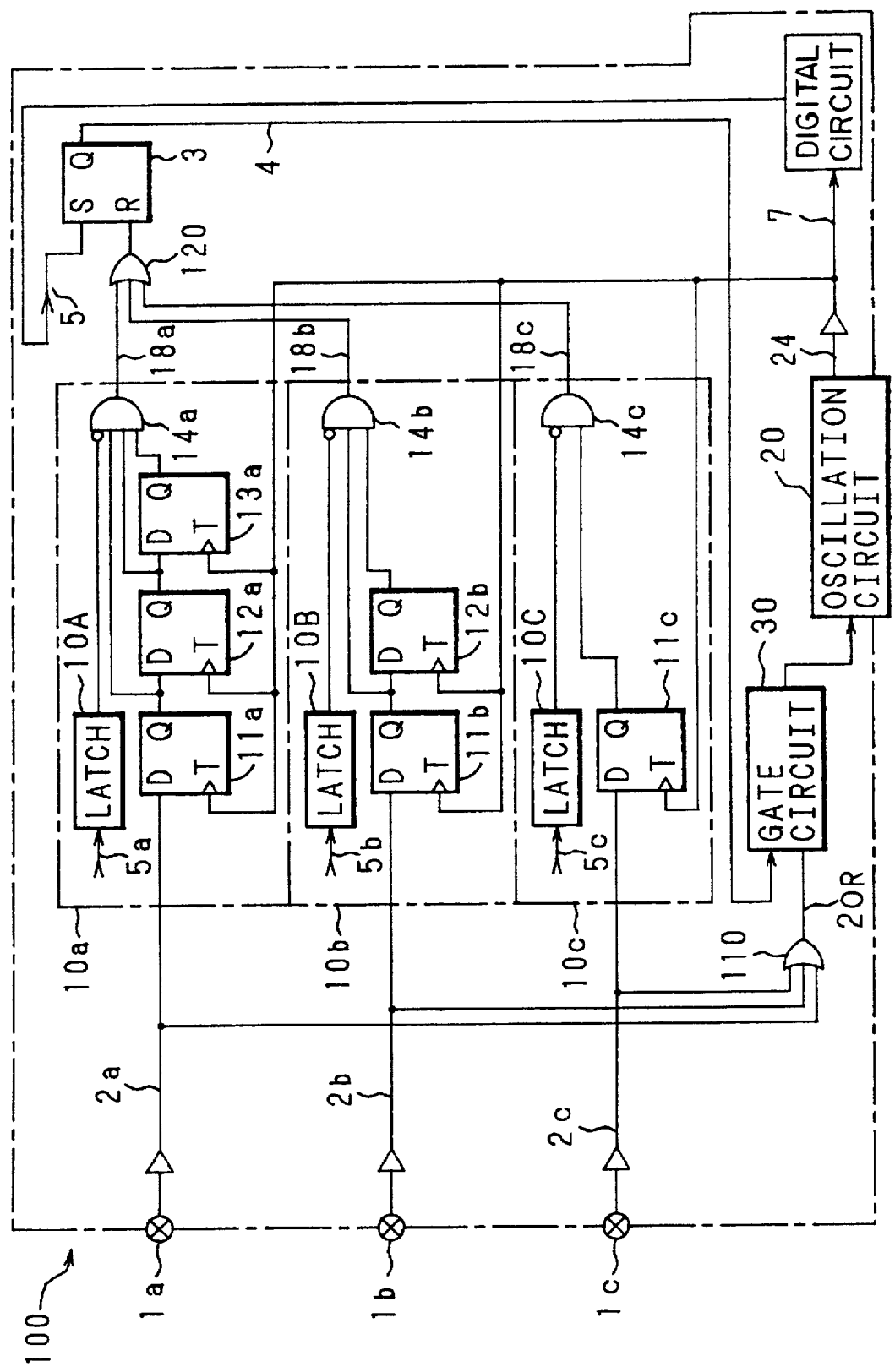
FIG. 6 is a circuit diagram showing a configuration example of a still another embodiment of a clock generating circuit for digital circuit of the invention and a semiconductor integrated circuit including it.

The circuit diagram shown in FIG. 6 is an example of an embodiment so configured as to set noise removal widths which are different from each other for a plurality of external input signals, and a plurality of sampling circuits are provided therein.

In FIG. 6, three interrupt input terminals receiving external input signals designated by reference characters 1a, 1b, 1c are provided. A signal inputted from the interrupt input terminal 1a is inputted to a sampling circuit 10a as an interrupt input signal 2a through a buffer, a signal inputted from the interrupt input terminal 1b is inputted to a sampling circuit 10b as an interrupt input signal 2b through a buffer, and a signal inputted from the interrupt input terminal 1c is inputted to a sampling circuit 10c as an interrupt input signal 2c through a buffer.

And the respective interrupt input signals 2a, 2b and 2c are inputted to an OR gate 110 of three-input. The output signal 2OR of the OR gate 110 is inputted to an input end of an inverter 31 of a gate circuit 30 of the same configuration as that of the embodiment example shown in FIG. 2. In FIG. 6, the oscillation circuit 20 also has the same configuration as that of the embodiment example shown in FIG. 2.

By the way, in the embodiment example shown in FIG. 6, the numbers of stages of the D-flip flops in the respective plurality of sampling circuits 10a, 10b and 10c are different from each other. Specifically, in the sampling circuit 10a to which the interrupt input signal 2a is inputted from the interrupt input terminal 1a, three-stage D-flip flops 11a, 12a and 13a are provided, in the sampling circuit 10b to which the interrupt input signal 2b is inputted from the interrupt input terminal 1b, two-stage D-flip flops 11b, 12b are provided, and in the sampling circuit 10c to which the interrupt input signal 2c is inputted from the interrupt input terminal 1c, one-stage D-flip flop 11c is provided.

The respective sampling circuits 10a, 10b, 10c are provided with latches 10A, 10B, 10C for setting the respective valid/invalid. These latches 10A, 10B, 10c respectively latch oscillation stop setting signals 5a, 5b, 5c to be asserted (become in "H" level) in the case where the microcontroller configured on the semiconductor integrated circuit 100 executes the specific instruction.

In the sampling circuit 10a, the output signal of the latch 10A is inputted to a first input terminal of negative logic of a four-input AND gate 14a, and the output signals from the output terminals Q of the D-flip flops 11a, 12a and 13a are inputted to the second, third, fourth input terminals of positive logic of the AND gate 14a. In the sampling circuit 10b, the output signal of the latch 10B is inputted to a first input terminal of negative logic of a three-input AND gate 14b, and the output signal from the output terminals Q of the D-flip flops 11b, 12b are inputted to the second and third input terminals of positive logic of the AND gate 14b. Further, in the sampling circuit 10c, the output signal of the latch 10c is inputted to a first input terminal of negative logic of a two-input AND gate 14c, and the output signal from the output terminal Q of the D-flip flop 11c is inputted to the second input terminal of positive logic of the AND gate 14c.

Clock resuming signals 18a, 18b, 18c which are the output signals of the respective AND gates 14a, 14b, 14c are inputted to the reset terminal R of the oscillation stop signal holding latch 3 through a three-input OR gate 120.

Accordingly, in the case where, for example, there is a necessity that the operation of the sampling circuit 10a is made invalid for some reason, when the microcontroller asserts the oscillation stop setting signal 5a, data "1" showing that fact is latched to the latch 10A and is inputted to the first input terminal of negative logic of the AND gate 14a. Therefore, even in the case where all of the input signals to the other three input terminals of the AND gate 14a become in "H" level, since the clock resuming signal 18a keeps "L" level, the operation of the sampling circuit 10a becomes invalid.

In the same way as in the other sampling circuits 10b, 10c, it is possible to make the respective operations invalid by asserting the oscillation stop setting signal 5b, 5c.

Since the configuration other than the aforementioned is same as that in the embodiment shown in FIG. 2 and FIG. 5, explanation will be omitted.

In the embodiment shown in FIG. 6, to the signals respectively inputted to the three interrupt input terminals 1a, 1b, 1c, it is possible to set pulse widths of noises to be canceled which are respectively different from each other.

That is, in the oscillation stop state, when a signal of "H" level having a width over a period from the timing T2 to T5 shown in FIG. 3 is inputted to the interrupt input terminal 1a, the clock resuming signal 18a which is the output signal of the sampling circuit 10a becomes in "H" level to resume the oscillation of the oscillation circuit 20.

When a signal of "H" level having a width over a period from the timing T2 to T4 shown in FIG. 3 is inputted to the interrupt input terminal 1b, the clock resuming signal 18b which is the output signal of the sampling circuit 10b becomes in "H" level to resume the oscillation of the oscillation circuit 20.

Further, when a signal of "H" level having a width over a period from the timing T2 to T3 shown in FIG. 3 is inputted to the interrupt input terminal 1c, the clock resuming signal 18c which is the output signal of the sampling circuit 10c become in "H" level to resume the oscillation of the oscillation circuit 20.

Figure 7:
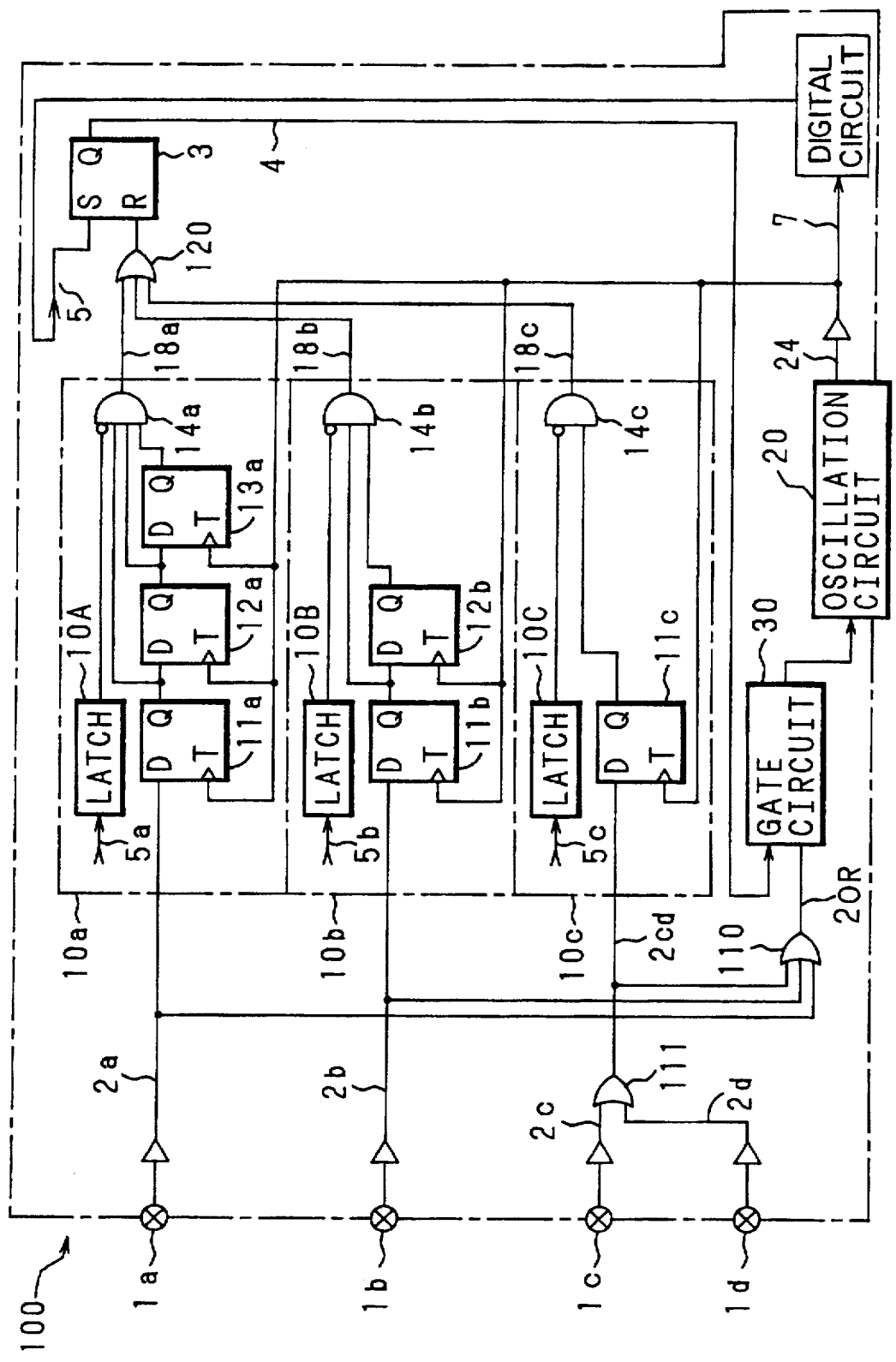
FIG. 7 is a circuit diagram showing a configuration example of a still further embodiment of a clock generating circuit for digital circuit of the invention and a semiconductor integrated circuit including it.

The circuit diagram shown in FIG. 7 is an embodiment combining the embodiments shown in the aforementioned FIG. 6 and FIG. 5. That is, further an interrupt input terminal 1d is provided in the embodiment shown in FIG. 6. The input signal 2c from the interrupt input terminal 1c and an interrupt input signal 2d from the interrupt input terminal 1d are inputted to the two-input OR gate 111 and inputted to the sampling circuit 10c and the OR gate 110 as an interrupt input signal 2cd.

Since the other configuration is same as that of the embodiment shown in FIG. 6, explanation will be omitted. The other operations are basically same as those in the embodiment shown in FIG. 6. To the sampling circuit 10c, the interrupt input signals 2c and 2d are inputted from the interrupt input terminals 1c and 1d to the sampling circuit 10c and the operation is same as that in the embodiment shown in FIG. 5.

Figure 8:
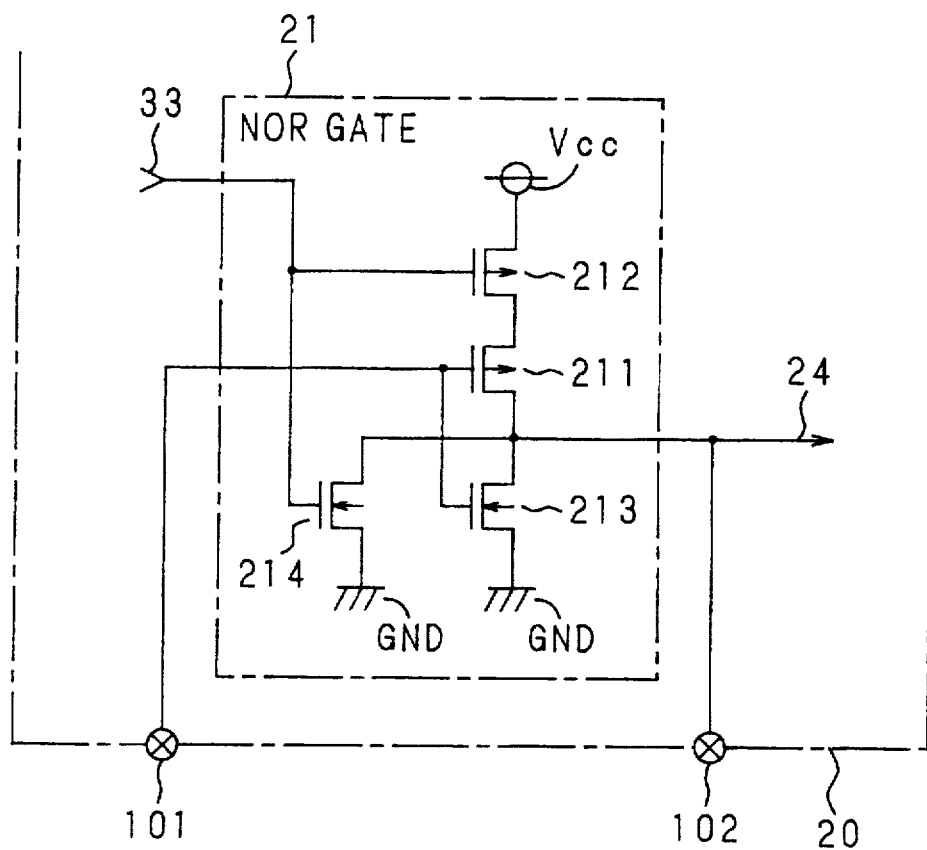
FIG. 8 is a circuit diagram showing a configuration example of a logical gate used for a conventional clock generating circuit.

By the way, the NOR gate 21 used as a logical circuit in the oscillation circuit 20 generally adopts a well-known circuit configuration as shown in the circuit diagram of FIG. 8 when it is realized by MOS transistors on the semiconductor integrated circuit 100.

In FIG. 8, P channel transistors 211 and 212 are connected in series, and N channel transistors 213, 214 are connected in parallel. To the respective gate electrodes of the P channel transistor 212 and N channel transistor 214, the output signal 33 of the gate circuit 30 is connected, and to the respective gate electrodes of the P channel transistor 211 and N channel transistor 213, the input terminal 101 is connected.

In addition, in the following explanation, the output signal 33 of the gate circuit 30 is called the oscillation stop signal 33. But, from the view point that the oscillation of the oscillation circuit 20 is stopped, the oscillation stop signal 33 is "H" level active. Accordingly, when it is asserted, it becomes in "H" level.

A source electrode of the second P channel transistor 212 is connected to a power source line Vcc, and the respective source electrodes of the first and second N channel transistors 213 and 214 are connected to the ground line GND. The respective drain electrodes of the first P channel transistor 211 and the first and second N channel transistors 213 and 214 are connected to the output terminal 102 as well as become the output signal 24 of the oscillation circuit 20.

Therefore, in the circuit of FIG. 8, in the case where the oscillation stop signal 33 is negated, that is, in "L" level, the second P channel transistor 212 turns ON and the second N channel transistor 214 turns OFF. And the first P channel transistor 211 and the first N channel transistor 213 turn ON/OFF responsive to the level of the input signal to the input terminal 101. Accordingly, when the input signal from the input terminal 101 is in "L" level, current flows from the power source line Vcc to the output terminal 102 through the first P channel transistor 211 and the second P channel transistor 212. On the other hand, when the input signal from the input terminal 101 is in "H" level, current flows from the output terminal 2 to the ground line GND only through the first N channel transistor 213.

In the aforementioned respective embodiments, in the case where the oscillation stop signal 33 are in positive logic, that is, when they are asserted, they become in "L" level so as to stop the oscillation operation of the oscillation circuit 20. However, when they are in negative logic, that is, when they are asserted, it is also possible that they become in "L" level so as to stop the oscillation operation of the oscillation circuit 20. In this case, in each of the embodiments, the NOR gate 21 used as a logical circuit is replaced by a NAND gate.

Figure 9:
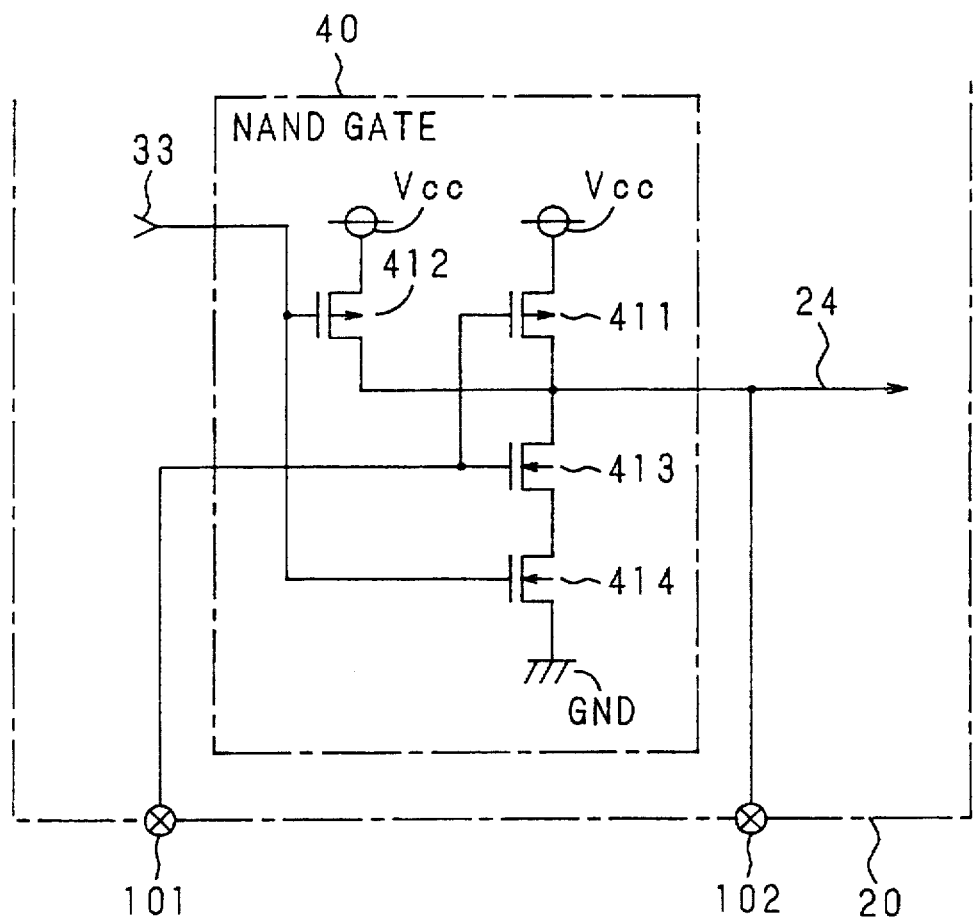
FIG. 9 is a circuit diagram showing another configuration example of a logical gate used for a conventional clock generating circuit.

FIG. 9 is a general circuit diagram in case of realizing such a NAND gate (designated by reference numeral 40) by MOS transistors.

In FIG. 9, P channel transistors 411 and 412 are connected in parallel, and N channel transistors 413 and 414 are connected in series. To the respective gate electrodes of the P channel transistor 412 and N channel transistor 414, the oscillation stop signal 33 is connected, and to the respective gate electrodes of the P channel transistor 411 and N channel transistor 413, the input terminal 101 is connected.

The source electrodes of the respective first and second P channel transistors 411, 412 are connected to the power source lines Vcc and the source electrode of the second N channel transistor 414 is connected to the ground line GND. And the drain electrodes of the first and second P channel transistors 411, 412 and the first N channel transistor 413 are connected to the output terminal 102 as well as become the output signal 24 of the oscillation circuit 20.

Therefore, in the circuit of FIG. 9, in the case where the oscillation stop signal 33 is negated, that is, "H" level, the second N channel transistor 414 turns ON and the second P channel transistor 412 turns OFF. And the first P channel transistor 411 and the first N channel transistor 413 turn ON/OFF responsive to the level of the input signal to the input terminal 101. Accordingly, when the input signal from the input terminal 101 is in "H" level, current flows from the output terminal 102 to the ground line GND through the first N channel transistor 413 and the second N channel transistor 414. On the other hand, when the input signal from the input terminal 101 is in "L" level, current flows from the power source line Vcc to the output terminal 102 only through the first P channel transistor 411.

In such a way, in a conventionally general NOR gate 21 or NAND gate 40 as a logical circuit configured by MOS transistors; the transistor configuration between the power source terminal and output terminal and the transistor configuration between the output terminal and ground terminal are different from each other. Therefore, it is difficult to design the output current to be symmetrical for a value of the potential which makes the operating point of input and output as a center, and as a result, it is difficult to design the oscillation duty to be in the vicinity of 50%. This has generally been a limiting factor of operation threshold frequency in a circuit using a clock.

From this view point, a circuit configuration capable of obtaining a symmetric operation characteristic with an operating point as a center is proposed in, for example, Japanese Patent Open No. 56-33899 (1981), Japanese Patent Application Laid-Open No. 82-132405 (1987), Japanese Patent Application Laid-Open No. 4-40005 (1992), Japanese Patent Application Laid-Open No. 63-202103 (1988), Japanese Patent Application Laid-Open No. 5-53678 (1993) and the like.

Figure 10:
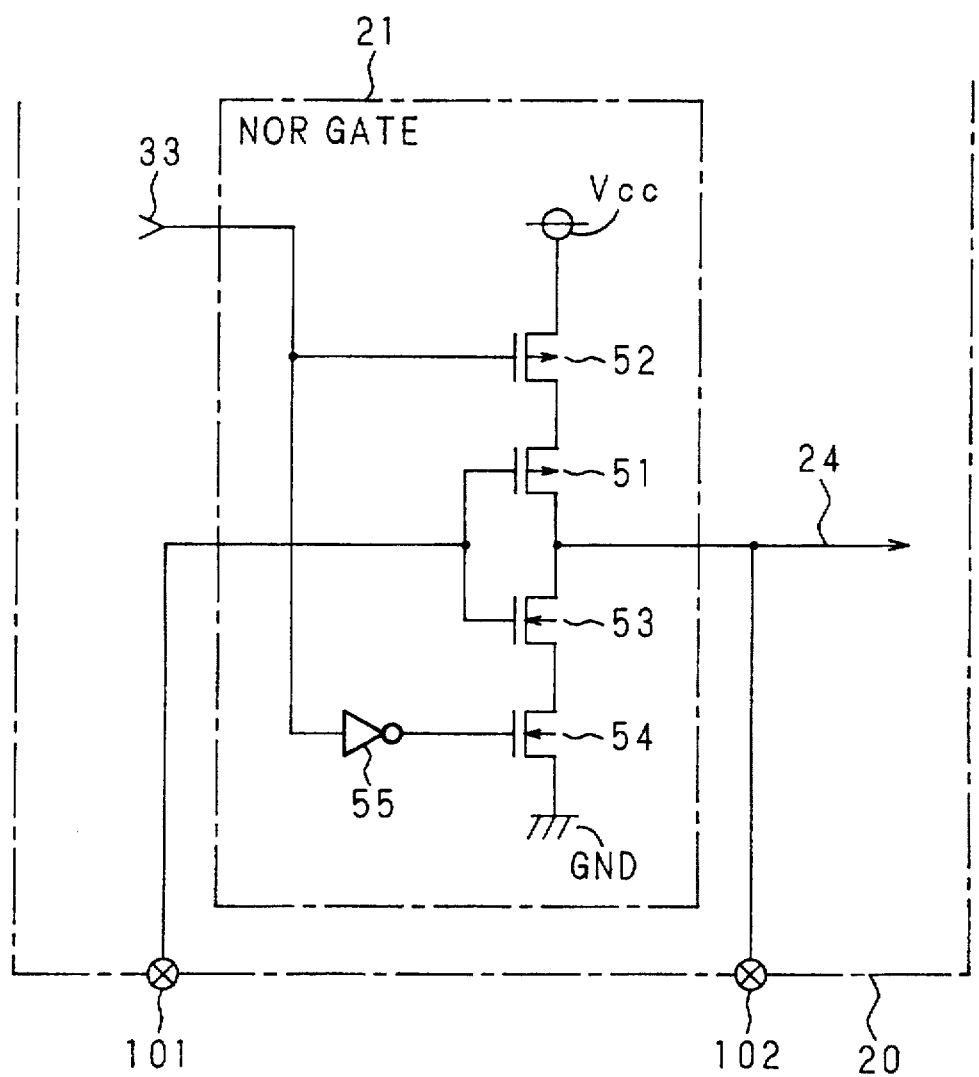
FIG. 10 is a circuit diagram showing another configuration example of a logical gate used for a conventional clock generating circuit.

An example of such a circuit configuration corresponding to a circuit diagram of FIG. 8 is shown in a circuit diagram of FIG. 10. In addition, in the same way as in case of FIG. 8, the oscillation stop signal 33 is in "H" level active from the viewpoint that the oscillation circuit 20 is stopped. Accordingly, when it is asserted, it becomes in "H" level.

In FIG. 10, P channel transistors 51 and 52 are connected in series and N channel transistors 53 and 54 are connected in parallel. To the gate electrode of the P channel transistor 52, the output signal 83 of the gate circuit 30 is connected, to the gate electrode of the N channel transistor 54, the oscillation stop signal 33 is connected through an inverter 55 and to the gate electrodes of the P channel transistor 51 and the N channel transistor 53, the input terminal 101 is connected.

The source electrode of the second P channel transistor 52 is connected to the power source line Vcc and the source electrode of the second N channel transistor 54 is connected to the ground line GND. And the drain electrodes of the first P channel transistor 51 and the first N channel transistor 53 are connected to the output terminal 102 as well as become the output signal 24 of the oscillation circuit 20.

Therefore, in a circuit of FIG. 10, when the oscillation stop signal 33 is negated, that is, in "L" level, the second P channel transistor 52 turns ON, and also the second N channel transistor 54 turns ON. And the first P channel transistor 51 and the first N channel transistor 53 turn ON/OFF responsive to the level of the input signal to the input terminal 101. Accordingly, when the input signal from the input terminal 101 is in "L" level, current flows from the power source line Vcc to the output terminal 101 through the first P channel transistor 51 and second P channel transistor 52. On the other hand, when the input signal from the input terminal 101 is in "H" level, current flows from the output terminal 2 to the ground line GND through not only the first N channel transistor 53 but also the second N channel transistor 54.

Actual operation is performed analog-likely and current determined by the potential of the input terminal 101 and the potential of the output terminal 102 flows through the first P channel transistor 51 and the first N channel transistor 53. When direct current characteristics of the first P channel transistor 51 and the first N channel transistor 53 are designed equally and direct current characteristics of the second P channel transistor 52 and the second N channel transistor 54 are designed equally, the oscillation circuit 20 performs symmetrical operations with the operating point which is the potential of a half of the power source potential as a center. The variations of the potential of the output terminal 102 is transmitted to the input terminal 101 through the resonator 23 which functions as a band pass filter. As a result, the oscillation in the vicinity of the resonance frequency of the resonator 23 continues. Accordingly, the oscillation duty of the oscillation circuit 20 is nearly 50% because the oscillation circuit 20 has a symmetrical current characteristic with its operating point as a center.

Figure 11:
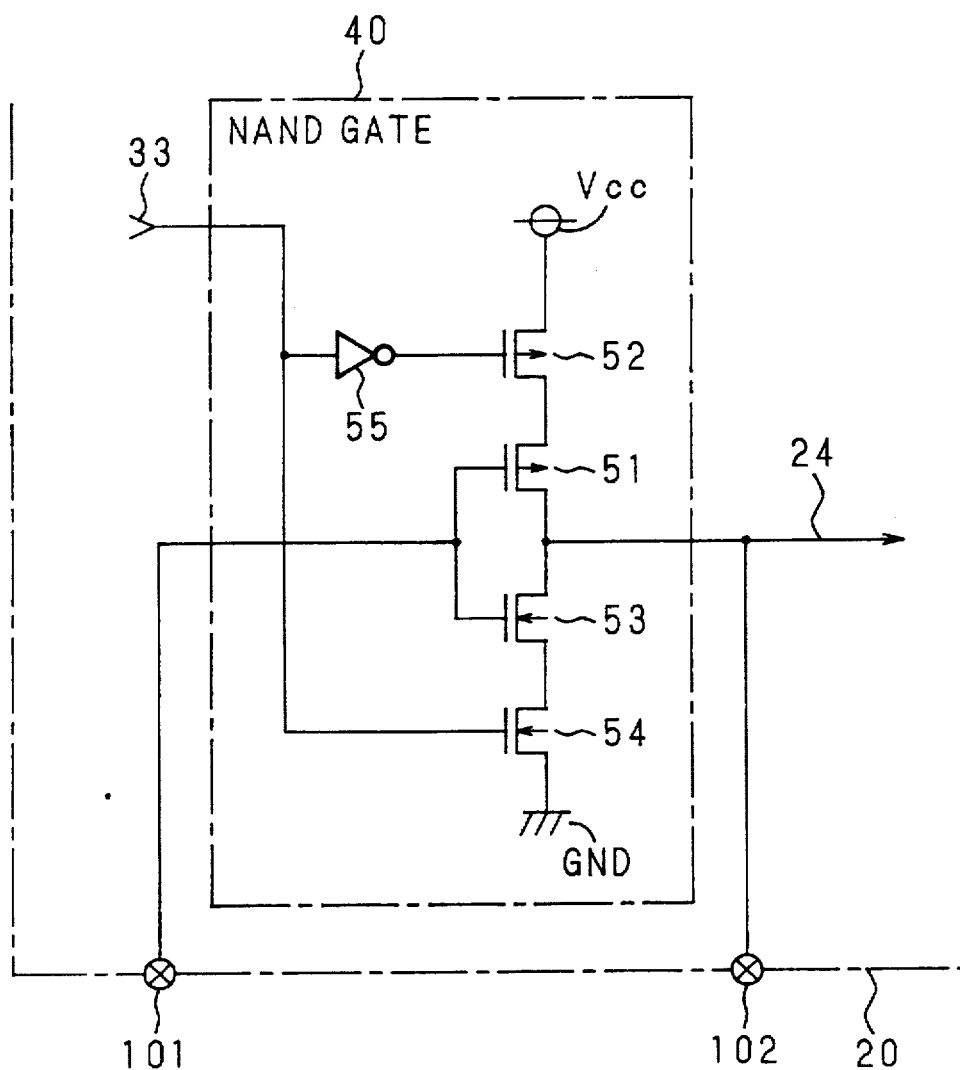
FIG. 11 is a circuit diagram showing another configuration example of a logical gate used for a conventional clock generating circuit.

An example corresponding to the circuit diagram of FIG. 9 is shown in FIG. 11. Here, in the same way as in FIG. 9, the oscillation stop signal 33 is in "L" level active from the viewpoint that it stops the oscillation of the oscillation circuit 20. Therefore when it is asserted, it becomes in "L" level.

In FIG. 11, except that the oscillation stop signal 33 is given through the inverter 55 not to the second N channel transistor 54 but to the gate electrode of the P channel transistor 52, the configuration is same as that of FIG. 10.

Therefore in the circuit of FIG. 11, when the oscillation stop signal 33 is negated, that is, "H" level, the second P channel transistor 52 turns ON, and the second N channel transistor 54 turns also ON. The first P channel transistor 51 and the first N channel transistor 53 turn ON/OFF responsive to the level of the input signal to the input terminal 101. Accordingly, when the input signal from the input terminal 101 is in "L" level, current flows from the power source line Vcc to the output terminal 102 through the first P channel transistor 51 and the second P channel transistor 52. On the other hand, when the input signal from the input terminal 101 is in "H" level, current flows from the output terminal 2 to the ground line GND not only through the first N channel transistor 53 but through the second N channel transistor 54.

In such logical circuit as shown in FIG. 10 and FIG. 11, a problem caused from the difference of the configuration of the transistor between the power source terminal and the output terminal from the configuration of the transistor between the output terminal and the ground terminal, is solved. However, in the case where a logical circuit shown in FIG. 10 or FIG. 11 is used in the oscillation circuit 20, when the oscillation stop mode setting signal 5 is in the negated state, in other words, when the output signal 33 of the gate circuit 30 is in the oscillation stop state in "L" level, there is a possibility that the output signal 24 of the oscillation circuit 20 becomes unstable due to the dispersion of the characteristics of the respective circuit elements. In order to avoid this, in the clock generating circuit of the invention, such configuration as to stable the output signal 24 of the oscillation circuit 20 is adopted when the oscillation circuit 20 stops oscillating.

In the following, explanation will be given on an example of a configuration of a logical circuit used in the oscillation circuit 20 of the clock generating circuit of the invention.

Figure 12:
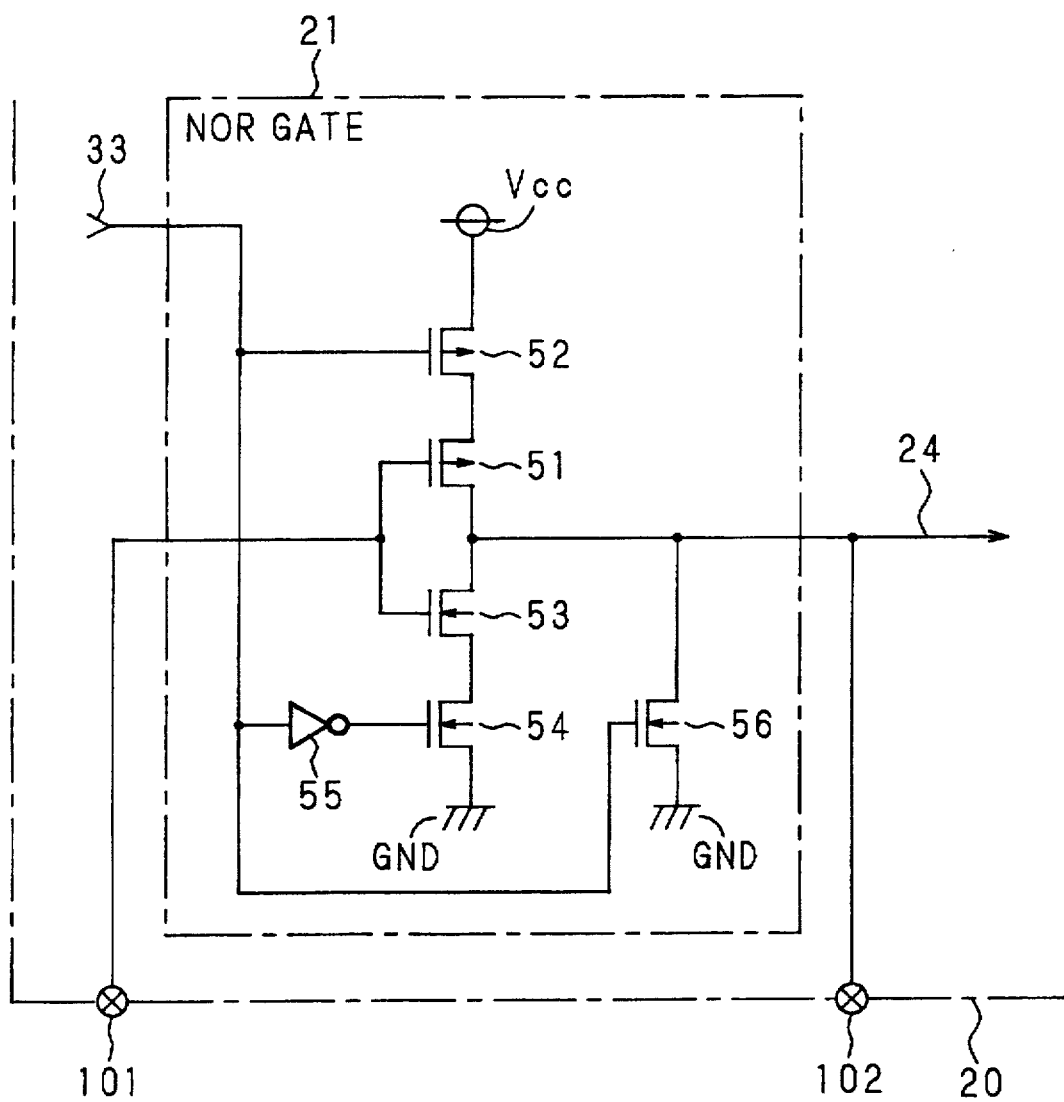
FIG. 12 is a circuit diagram showing a configuration example of one embodiment of a logical gate used for a clock generating circuit of the invention.

FIG. 12 is a circuit diagram showing an example corresponding to the circuit diagram of FIG. 8. Here, in the same way as in FIG. 8, the oscillation stop signal 33 is in "H" level active from the viewpoint that it stops the oscillation of the oscillation circuit 20. Therefore when it is asserted, it becomes in "H" level. The difference between the circuit shown in FIG. 12 and the aforementioned circuit shown in FIG. 8 is that, in the former circuit, a third N channel transistor 86, whose gate electrode is connected to the oscillation stop signal 33, source electrode to the ground line GND and drain electrode to the output terminal 102, is provided. In addition, the output from the drain electrode of the third N channel transistor 58 becomes the output signal 24 of the oscillation circuit 20.

The circuit of FIG. 12 operates in the same way as the aforementioned circuit of FIG. 8. Besides, in the circuit of FIG. 12, in the case where the oscillation stop signal 33 is asserted, that is, in "H" level, the third N channel transistor 58 turns ON and fixes the level of the output terminal 102, that is, the output signal 24 of the oscillation circuit 20 to "L" level.

Figure 13:
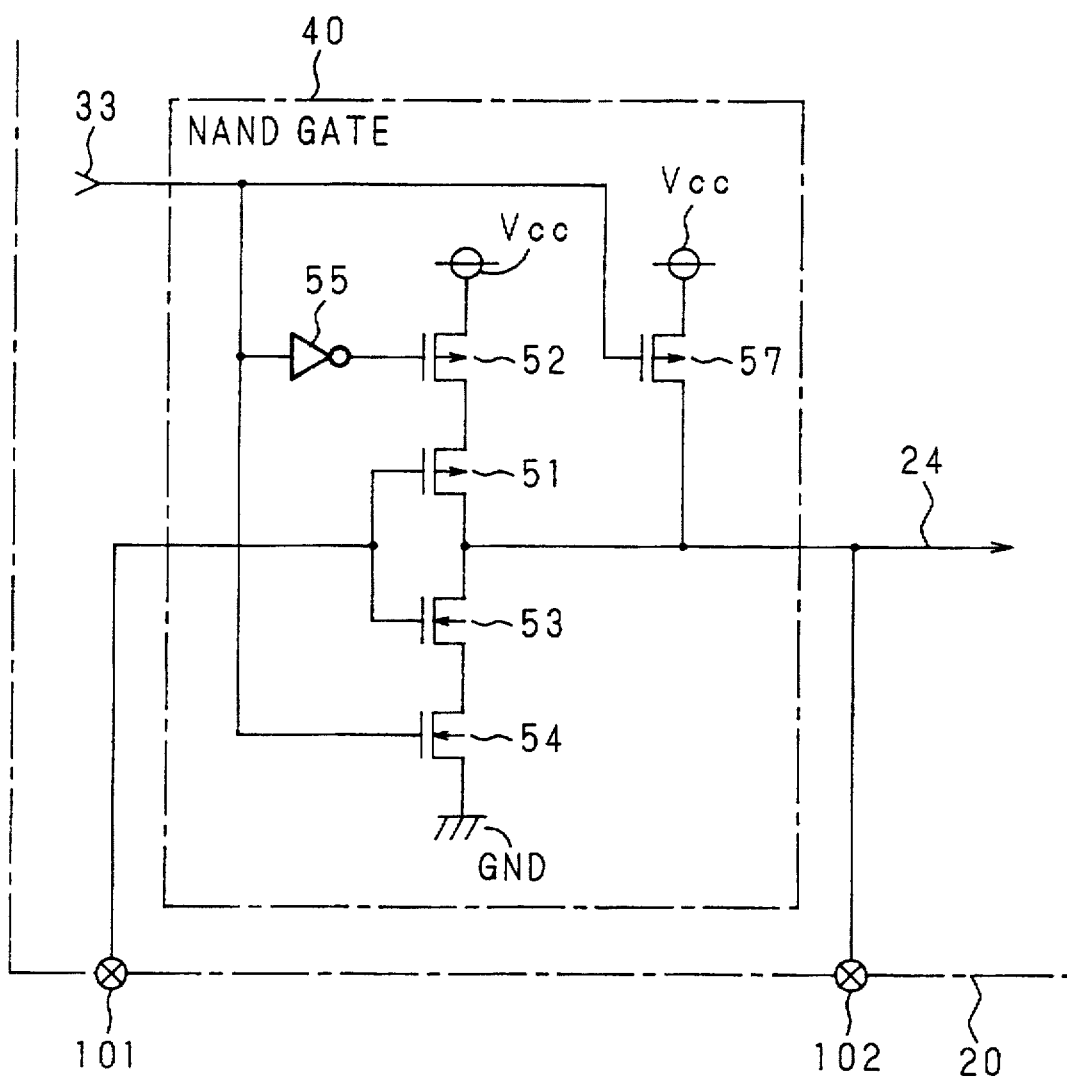
FIG. 13 is a circuit diagram showing a configuration example of one embodiment of a logical gate used for a clock generating circuit of the invention.

FIG. 13 is a circuit diagram showing an example corresponding to a circuit diagram of FIG. 9. Here, in the same way as in FIG. 9, the oscillation stop signal 33 is in "L" level active from the viewpoint that it slops the oscillation of the oscillation circuit 20. Therefore, when it is asserted, it becomes in "L" level.

The difference between the circuit shown in FIG. 13 and the aforementioned circuit shown in FIG. 9 is that, in the former circuit, a third P channel transistor 57, whose gate electrode is connected to the oscillation stop signal 33, source electrode to the power source line Vcc, and drain electrode to the output terminal 102, is provide. In addition, the output from the drain electrode of the third P channel transistor 57 becomes the output signal 24 of the oscillation circuit 20.

The circuit of FIG. 13 operates in the same way as the aforementioned circuit of FIG. 9. Besides, in the circuit of FIG. 13, when the oscillation stop signal 33 is asserted, that is, in "L" level, the third P channel transistor 57 turns ON and forcibly fixes the level of the output terminal 102, that is, the output signal 24 of the oscillation circuit 20 to "H" level.

Figure 14:
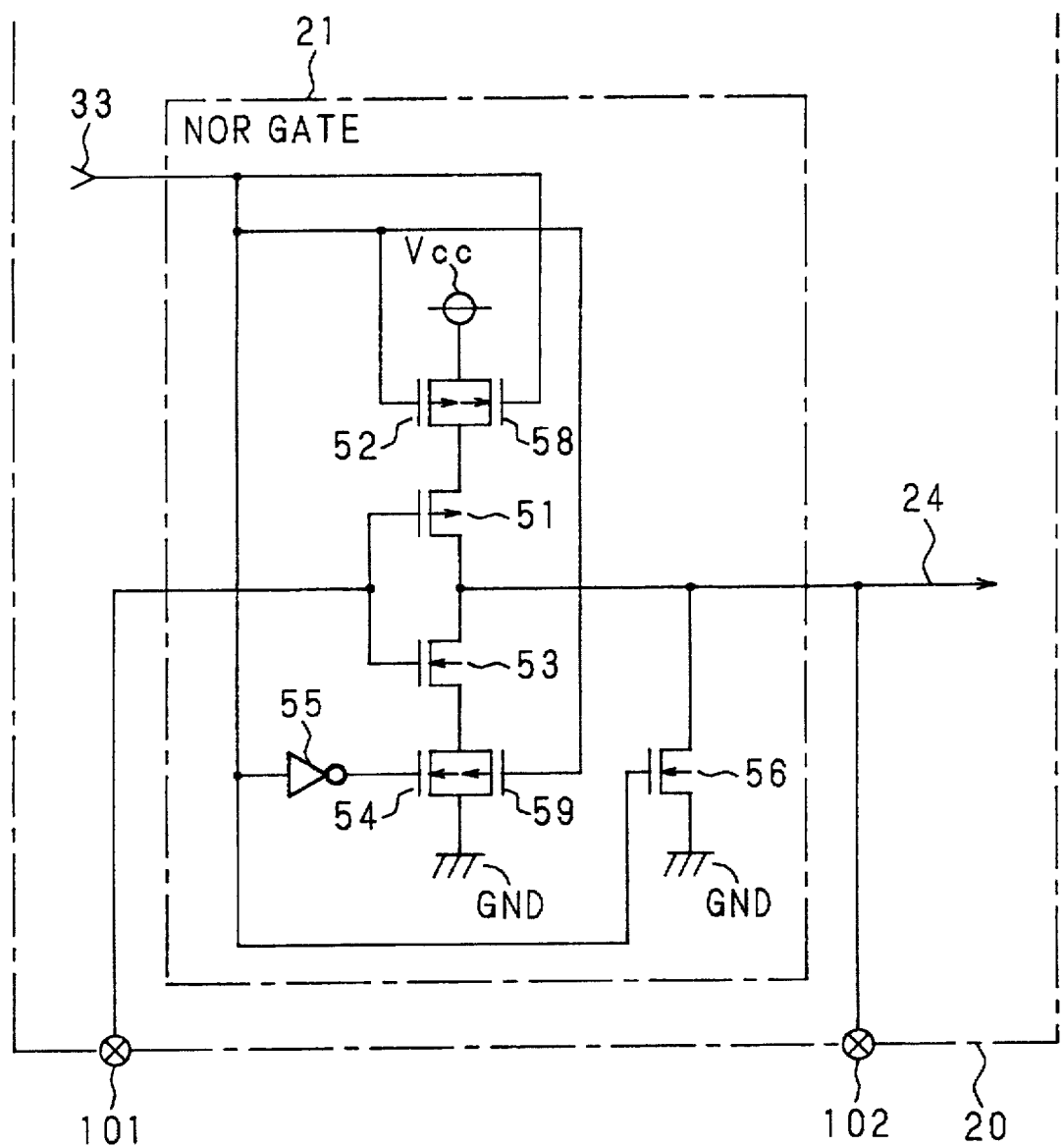
FIG. 14 is a circuit diagram showing a configuration example of one embodiment of a logical gate used for a clock generating circuit of the invention.
Figure 15:
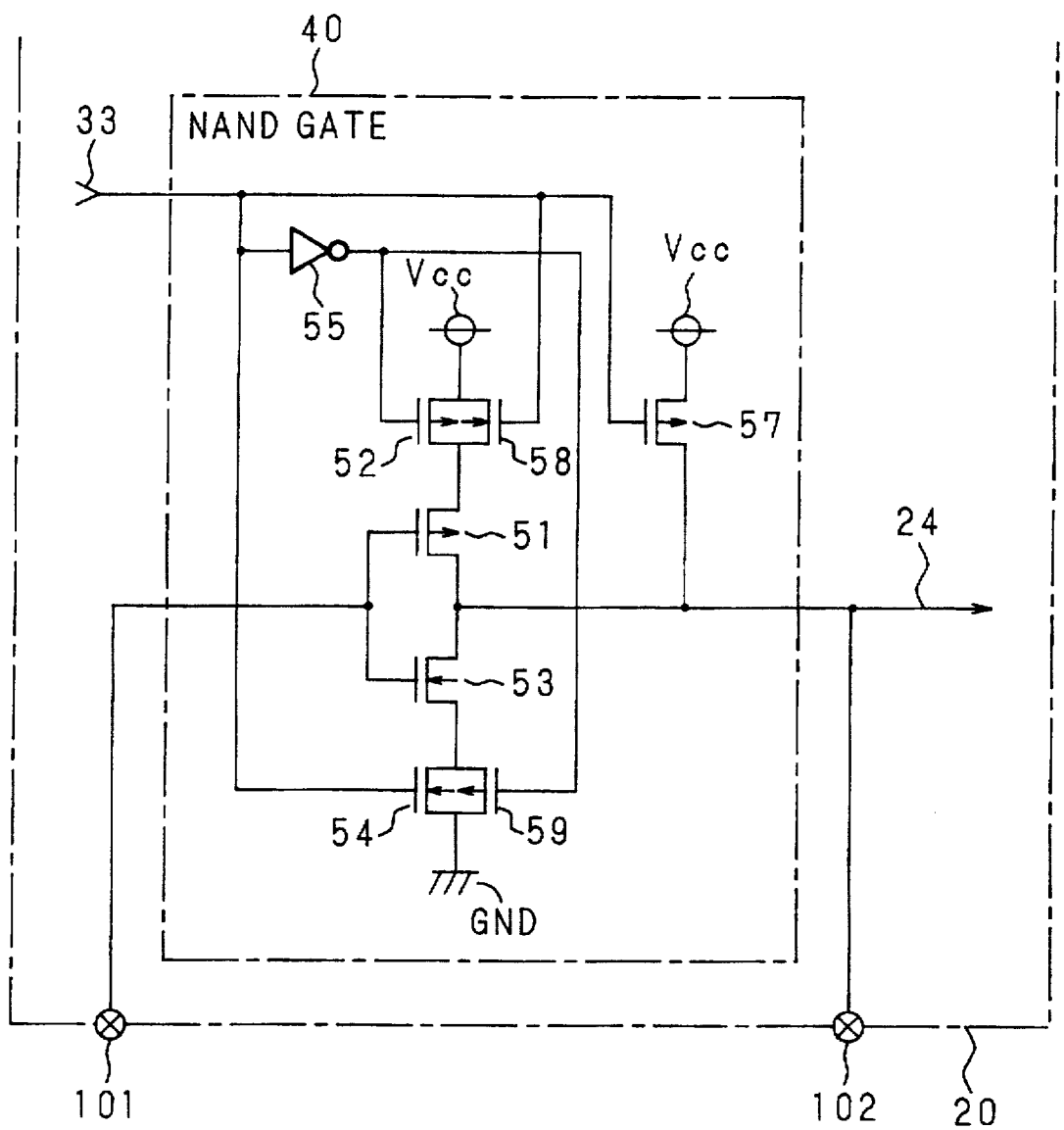
FIG. 15 is a circuit diagram showing a configuration example of one embodiment of a logical gate used for a clock generating circuit of the invention.

FIG. 14 is a circuit diagram showing another example corresponding to the circuit diagram of FIG. 8, and FIG. 15 is a circuit diagram showing another example corresponding to the circuit diagram of FIG. 9.

The circuit shown in FIG. 14 is obtained by further connecting an N channel transistor 58 to the second P channel transistor 52 in parallel and connecting a P channel transistor 59 to the second N channel transistor 54 in parallel in the circuit shown in FIG. 12.

The circuit shown in FIG. 15 is obtained by further connecting the N channel transistor 58 to the second P channel transistor 52 in parallel and connecting P channel transistor 59 to the second N channel transistor 54 in parallel in the circuit shown in FIG. 13.

In addition, in each of the circuits of FIG. 14 and FIG. 15, the oscillation stop signal 33 is inputted to the gate electrodes of the N channel transistor 58 and the P channel transistor 59.

The reason why such circuit configuration shown in FIG. 14 and FIG. 15 is adopted is that, even when there is a difference of direct current characteristic in production process between the respective P channel transistors and N channel transistors other than the two transistors 58, 59, the influence of the oscillation circuit 20 to be given to the characteristic of the output current is reduced.

In addition, in the aforementioned embodiment, the transistors 52, 54 controlled by the oscillation stop signal 33 are positioned closer to the respective power source line Vcc and the ground line GND than transistors 51, 53 connected to the input terminal 101. The reason is, since the source potentials of the transistors 51, 53 closer to the output terminal 102 are raised, it is intended that the potential of the input terminal is reflected easily to the output current by limiting the current of the transistors 51, 53 than that of the transistors.

In such a way, when such a circuit configuration as shown in each diagram of FIG. 10 and the following figures is adopted to a logical circuit of the oscillation circuit 20, the clock generating circuit of the invention has a control function which stops the clock oscillation as well as become easy to design the clock duty.

As described above, according to the invention, a semiconductor integrated circuit including a digital circuit having a clock stop state, with a microcontroller as a representative, can be improved, as to an external input signal which urges to return from the clock stop state to the clock oscillation state, by enlarging the width of a noise to be removed included in the external input signal and setting the width precisely.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A clock generating circuit, comprising:

an input terminal for inputting an external signal;

signal generating means for receiving a first value or a second value so as to output a clock stop control signal having a first signal level when receiving said first value, and to output the clock stop control signal having a second signal level when receiving said second value;

clock generating means, including:
   oscillating means for oscillating clocks;
   and controlling means for, which receives said clock stop control signal via a gating means, controlling said oscillation means to stop generation of a clock signal when said clock stop control signal is at the first signal level, and for controlling the same to start the generation of the clock signal when said clock stop control signal is at the second signal level;

the gating means for, when the external signal is a predetermined external signal value inputted to said input terminal, outputting said clock stop control signal outputted from said signal generating means at the second signal level, and input to said controlling means in said clock generating means; and sampling means for sampling the external signal inputted to said input terminal and received therefrom in synchronism with the clock signal generated by said clock generating means;

wherein when the external signal is inputted to said input terminal, said clock generating means starts to generate the clock signal responsive to the clock stop control signal having the second signal level being transmitted to said controlling means from said gating means;

wherein said sampling means starts to sample the external signal inputted to said input terminal responsive to said clock generating means starting to generate the clock signal, and outputs a clock resuming signal when a predetermined number of sampling results having predetermined values are continuously sampled, and wherein said signal generating means receives said second value and outputs the clock stop control signal having the first signal level when the clock resuming signal is outputted from said sampling means to said signal generating means.

2. A clock generating circuit as set forth in claim 1 wherein said sampling means, having:

one or a plurality of cascade-connected flip flops, in which at least first stage flip flop latching the level of the external signal inputted to said input terminal in synchronism with the clock signal generated by said clock generating means and outputting a first signal responsive to a first predetermined level of the latching level; and second and following stage flip flops latching the output levels of the respective preceding stages in synchronism with the clock signal generated by said clock generating means and outputting second signals responsive to a second predetermined level of the latched levels;

whereby, when the number of said flip flops is one, the output signal of the flip flop is outputted as said clock resuming signal, and when the number of said flip flops is two or more, the clock resuming signal is outputted responsive to the first and second predetermined levels of the output signals of all the flip flops.

3. A clock generating circuit, comprising:

a plurality of input terminals for inputting external signals respectively;

logical summing means for outputting a logical sum signal when an external signal is inputted from either of said plurality of input terminals;

signal generating means for receiving a first value or a second value so as to output a clock stop control signal having a first signal level when receiving said first value, and to output the clock stop control signal having a second signal level when receiving said second value;

clock generating means, including:
 oscillating means for oscillating clocks; and
 controlling means for, which receives said clock stop control signal via a gating means, controlling said oscillation means to stop generation of a clock signal when said clock stop control signal is at the first signal level, and for controlling the same to start the generation of the clock signal when said clock stop control signal is at the second signal level;

the gating means for, when the logical sum signal is outputted from said logical summing means, outputting said clock stop control signal outputted from said signal generating means at the second signal level, and input to said controlling means in said clock generating means; and sampling means for sampling the logical sum signal outputted from said logical summing means and received therefrom in synchronism with the clock signal generated by said clock generating means;

wherein when the logical sum signal is outputted from said logical summing means, said clock generating means starts to generate the clock signal responsive to the clock stop control signal having the second signal level being transmitted to said controlling means from said gating means, wherein said sampling means starts to sample the logical sum signal outputted from said logical summing means responsive to said clock generating means starting to generate the clock signal, and outputs a clock resuming signal when a predetermined number of sampling results having predetermined values are continuously sampled, and wherein said signal generating means receives said second value and outputs the clock stop control signal having the second signal level when the clock resuming signal is outputted from said sampling means to said signal generating means.

4. A clock generating circuit as set forth in claim 3 wherein said sampling means, having:

one or a plurality of cascade-connected flip flops, in which at least first stage flip flop latching the level of the logical sum signal outputted from said logical summing means in synchronism with the clock signal generated by said clock generating means and outputting a first signal responsive to a first predetermined level of the latching level; and second and following stage flip flops latching the output levels of the respective preceding stages in synchronism with the clock signal generated by said clock generating means and outputting second signals responsive to a second predetermined level of the latched levels;

whereby, when the number of said flip flops is one, the output signal of the flip flop is outputted as said clock resuming signal, and when the number of said flip flops is two or more, the clock resuming signal is outputted responsive to the first and second predetermined levels of the output signals of all the flip flops.

5. A clock generating circuit, comprising:

a plurality of input terminals for inputting external signals respectively;

logical summing means for outputting a logical sum signal when an external signal is inputted from either of said plurality of input terminals;

signal generating means for receiving a first value or a second value so as to output a clock stop control signal having a first signal level when receiving said first value, and to output the clock stop control signal having a second signal level when receiving said second value;

clock generating means, including:
 oscillating means for oscillating clocks; and
 controlling means for, which receives said clock stop control signal via a gating means, controlling said oscillation means to stop generation of a clock signal when said clock stop control signal is at the first signal level, and for controlling the same to start the generation of the clock signal when said clock stop control signal is at the second signal level;

the gating means for, when the logical sum signal is outputted from said logical summing means, outputting said clock stop control signal outputted from said signal generating means at the second signal level, and input to said controlling means in said clock generating means; and a plurality of sampling means for, each which is connected to respective said input terminals, sampling the external signal inputted to each input terminal and received therefrom respectively in synchronism with the clock signal generated by said clock generating means respectively;

wherein when the logical sum signal is outputted from said logical summing means, said clock generating means starts to generate the clock signal responsive to the clock stop control signal having the second signal level being transmitted to said controlling means from said gating means, wherein each said sampling means starts to sample the external signal inputted to the input terminal to which each said sampling means is connected responsive to said clock generating means starting to generate the clock signal, and outputs a clock resuming signal when a predetermined number of sampling results having predetermined levels are continuously sampled, and wherein said signal generating means receives said second value and outputs the clock stop control signal having the first signal level when the clock resuming signal is outputted from either said sampling means to said signal generating means.

6. A clock generating circuit as set forth in claim 5, wherein said plurality of sampling means, each having:

one or a plurality of cascade-connected flip flops in which at least first stage flip flop latching the level of the external signal inputted to the input terminal connected thereto in synchronism with the clock signal generated by said clock generating means and outputting a first signal responsive to a first predetermined level of the latched level; and second and following stage flip flops latching the output levels of the respective preceding stages in synchronism with the clock signal generated by said clock generating means and outputting second signals responsive to a second predetermined level of the latched levels;

whereby when the number of said flip flops is one, the output signal of the flip flop is outputted as said clock resuming signal, and when the number of said flip flops is two or more, the clock resuming signal is outputted responsive to the first and second predetermined levels of the output signals of all the flip flops.

7. A clock generating circuit, for supplying a clock signal to a digital circuit which operates in synchronism with said clock signal comprising:

an input terminal for inputting an external signal;

signal generating means for receiving a first value when a signal is received from said digital circuit, and a second value when an external signal is inputted to said input terminal so as to output a clock stop control signal having a first signal level when receiving said first value, and to output the clock stop control signal having a second signal level when receiving said second value;

clock generating means, including:

oscillating means for oscillating clocks; and controlling means for, which receives said clock stop control signal via a gating means, controlling said oscillation means to stop generation of said clock signal when said clock stop control signal is at the first signal level, and for controlling the same to start the generation of the clock signal when said clock stop control signal is at the second signal level;

the gating means for, when the external signal is a predetermined external signal value and is inputted to said input terminal, outputting said clock stop control signal outputted from said signal generating means at the second signal level, and input to said controlling means in said clock generating means; and sampling means for sampling the external signal inputted to said input terminal and received therefrom in synchronism with the clock signal generated by said clock generating means;

wherein when the external signal is inputted to said input terminal, said clock generating means starts to generate the clock signal responsive to the clock stop control signal having the second signal level being transmitted to said controlling means from said gating means, wherein said sampling means starts to sample the external signal inputted to said input terminal responsive to said clock generating means starting to generate the clock signal, and outputs a clock resuming signal when a predetermined number of sampling results having predetermined values are continuously sampled, and wherein said signal generating means receives said second value and outputs the clock stop control signal having the second signal level when the clock resuming signal is outputted from said sampling means to said signal generating means.

8. A clock generating circuit as set forth in claim 7, wherein said sampling means, having:

one or a plurality of cascade-connected flip flops, in which at least first stage flip flop latching the level of the external signal inputted to said input terminal is synchronism with the clock signal generated by said clock generating means and outputting a first signal responsive to a first predetermined level of the latched level; and second and following stage flip flops latching the output levels of the respective preceding stages in synchronism with the clock signal generated by said clock generating means and outputting second signals responsive to a second predetermined level of the latched levels;

whereby, when the number of said flip flops is one, the output signal of the flip flop is outputted as said clock resuming signal, and when the number of said flip flops is two or more, the clock resuming signal is outputted responsive to the first and second predetermined levels of the output signals of all the flip flops.

9. A clock generating circuit, for supplying a clock signal to a digital circuit which operates in synchronism with said clock signal, comprising:

a plurality of input terminals for inputting external signals respectively;

logical summing means for outputting a logical sum signal when an external signal from at least one of the external signals is inputted from either of said plurality of input terminals;

signal generating means for receiving a first value when a signal is received from said digital circuit, and a second value when the external signal is inputted to said input terminal so as to output a clock stop control signal having a first signal level when receiving said first value, and to output the clock stop control signal having a second signal level when receiving said second value;

clock generating means, including:

oscillating means for oscillating clocks; and controlling means for, which receives said clock stop control signal via a gating means, controlling said oscillation means to stop generation of said clock signal when said clock stop control signal is at the first signal level, and for controlling the same to start the generation of the clock signal when said clock stop control signal is at the second signal level;

the gating means for, when the logical sum signal is outputted from said logical summing means outputting said clock stop control signal outputted from said signal generating means at the second signal level, and input to said controlling means in said clock generating means; and sampling means for sampling the logical sum signal outputted from said logical summing means and received therefrom in synchronism with the clock signal generated by said clock generating means;

wherein when the logical sum signal is outputted from said logical summing means, said clock generating means starts to generate the clock signal responsive to the clock stop control signal having the second signal level being transmitted to said controlling means from said gating means, wherein said sampling means starts to sample the logical sum signal outputted from said logical summing means responsive to said clock generating means starting to generate the clock signal, and outputs a clock resuming signal when a predetermined number of sampling results having predetermined levels are continuously sampled, and wherein said signal generating means receives said second value and outputs the clock stop control signal having the second signal level when the clock resuming signal is outputted from said sampling means to said signal generating means.

10. A clock generating circuit as set forth in claim 9, wherein said sampling means, having:

one or a plurality of cascade-connected flip flops, in which at least first stage flip flop latching the level of the logical sum signal outputted from said logical summing means in synchronism with the clock signal generated by said clock generating means and outputting a first signal responsive to a first predetermined level of the latched level; and second and following stage flip flops latching the output levels of the respective preceding stages in synchronism with the clock signal generated by said clock generating means and outputting second signals responsive to a second predetermined level of the latched levels;

whereby, when the number of said flip flops is one, the output signal of the flip flop is outputted as said clock resuming signal, and when the number of said flip flops is two or more, the clock resuming signal is outputted responsive to the first and second predetermined levels of the output signals of all the flip flops.

11. A clock generating circuit, for supplying a clock signal to a digital circuit which operates in synchronism with said clock signal, comprising:

a plurality of input terminals for inputting external signals respectively;

logical summing means for outputting a logical sum signal when an external signal is inputted from either of said plurality of input terminals;

signal generating means for receiving a first value when a signal is received from said digital circuit, and a second value when the external signal is inputted to said input terminal so as to output a clock stop control signal having a first signal level when receiving said first value, and to output the clock stop control signal having a second signal level when receiving said second value;

clock generating means, including:
  oscillating means for oscillating clocks; and
  controlling means for, which receives said clock stop control signal via a gating means, controlling said oscillation means to stop generation of said clock signal when said clock stop control signal is at the first signal level, and for controlling the same to start the generation of the clock signal when said clock stop control signal is unsignificant;

the gating means for, when the logical sum signal is outputted from said logical summing means outputting said clock stop control signal outputted from said signal generating means at the second signal level, and input to said controlling means in said clock generating means; and a plurality of sampling means for each which is connected to respective said input terminals, sampling the external signal inputted to each input terminal in synchronism with the clock signal generated by said clock generating means respectively;

wherein when the logical sum signal is outputted from said logical summing means, said clock generating means starts to generate the clock signal responsive to the clock stop control signal having the second signal level being transmitted to said controlling means from said gating means, wherein each said sampling means starts to sample the external signal inputted to the input terminal to which each said sampling means is connected responsive to said clock generating means starting to generate the clock signal, and outputs a clock resuming signal when a predetermined number of sampling results having predetermined levels are continuously sampled, and wherein said signal generating means receives said second value and outputs the clock stop control signal having the second signal level when the clock resuming signal is outputted from either of said sampling means to said signal generating means.

12. A clock generating circuit as set forth in claim 11, wherein said plurality of sampling means, each having:

one or a plurality of cascade-connected flip flops, in which at least first stage flip flop latching the level of the external signal inputted to the input terminal connected thereto in synchronism with the clock signal generated by said clock generating means and outputting a first signal responsive to a first predetermined level of the latched level; and second and following stage flip flops latching the output levels of the respective preceding stages in synchronism with the clock signal generated by said clock generating means and outputting second signals responsive to a second predetermined level of the latched levels;

whereby, when the number of said flip flops is one, the output signal of the flip flop is outputted as said clock resuming signal, and when the number of said flip flops is two or more, the clock resuming signal is outputted responsive to the first and second predetermined levels of the output signals of all the flip flops.

13. A semiconductor integrated circuit, being provided with:

a digital circuit which operates in synchronism with a clock signal:

an input terminal for inputting an external signal; and a clock generating circuit which supplies the clock signal to said digital circuit, comprising:

signal generating means for receiving a first value when a signal having a first predetermined level is given from said digital circuit, and a second value when the external signal having a second predetermined level is inputted to said input terminal so as to output a clock stop control signal having a first signal level when receiving said first value, and to output the clock stop control signal having a second signal level when receiving said second value;

clock generating means, including:

oscillating means for oscillating clocks; and controlling means for, which receives said clock stop control signal via a gating means, controlling said oscillation means to stop generation of said clock signal when said clock stop control signal is at the first signal level, and for controlling the same to start the generation of the clock signal when said clock stop control signal is at the second signal level;

the gating means for when the external signal is inputted to said input terminal, outputting said clock stop control signal outputted from said signal generating means at the second signal level, and input to said controlling means in said clock generating means; and sampling means for sampling the external signal inputted to said input terminal and received therefrom in synchronism with the clock signal generated by said clock generating means;

wherein when the significant external signal is inputted to said input terminal, said clock generating means starts to generate the clock signal responsive to the clock stop control signal having the second signal level being transmitted to said controlling means from said gating means, wherein said sampling means starts to sample the external signal inputted to said input terminal responsive to said clock generating means starting to generate the clock signal, and outputs a clock resuming signal when a predetermined number of sampling results having predetermined values are continuously sampled, and wherein said signal generating means receives said second value and outputs the clock stop control signal having the second signal level when the clock resuming signal is outputted from said sampling means to said signal generating means.

14. A semiconductor integrated circuit as set forth in claim 13, wherein said sampling means, having:

one or a plurality of cascade-connected flip flops, in which at least first stage flip flop latching the level of the external signal inputted to said input terminal in synchronism with the clock signal generated by said clock generating means and outputting a first signal responsive to a first predetermined level of the latched level; and second and following stage flip flops latching the output levels of the respective preceding stages in synchronism with the clock signal generated by said clock generating means and outputting second signals responsive to a second predetermined level of the latched levels;

whereby, when the number of said flip flops is one, the output signal of the flip flop is outputted as said clock resuming signal, and when the number of said flip flops is two or more, the clock resuming signal is outputted responsive to the first and second predetermined levels of the output signals of all the flip flops.

15. A semiconductor integrated circuit, being provided with:

a digital circuit which operates in synchronism with a clock signal:

a plurality of input terminals for inputting external signals respectively; and a clock generating circuit which supplies the clock signal to said digital circuit, comprising:

logical summing means for outputting a logical sum signal when one of the external signals is inputted from either of said plurality of input terminals;

signal generating means for receiving a first value when a signal is received from said digital circuit, and a second value when one of the external signals is inputted to said input terminal so as to output a clock stop control signal having a first signal level when receiving said first value, and to output the clock stop control signal having a second signal level when receiving said second value;

clock generating means, including:

oscillating means for oscillating clocks; and controlling means for, which receives said clock stop control signal via a gating means, controlling said oscillation means to stop generation of said clock signal when said clock stop control signal is at the first signal level, and for controlling the same to start the generation of the clock signal when said clock stop control signal is at the second signal level;

the gating means for, when the logical sum signal is outputted from said logical summing means, outputting said clock stop control signal outputted from said signal generating means at the second signal level and input to said controlling means in said clock generating means; and sampling means for sampling the logical sum signal outputted from said logical summing means and received therefrom in synchronism with the clock signal generated by said clock generating means;

wherein when the logical sum signal is outputted from said logical summing means, said clock generating means starts to generate the clock signal responsive to the clock stop control signal having the second signal level being transmitted to said controlling means from said gating means, wherein said sampling means starts to sample the logical sum signal outputted from said logical summing means responsive to said clock generating means starting to generate the clock signal, and outputs a clock resuming signal when a predetermined number of sampling results having predetermined levels are continuously sampled, and wherein, said signal generating means receives said second value and outputs the clock stop control signal having the second signal level when the clock resuming signal is outputted from said sampling means to said signal generating means.

16. A semiconductor integrated circuit as set forth in claim 15, wherein said sampling means, having:

one or a plurality of cascade-connected flip flops, in which at least first stage flip flop latching the level of the logical sum signal outputted from said logical summing means in synchronism with the clock signal generated by said clock generating means and outputting a first signal responsive to a first predetermined level of the latched level; and second and following stage flip flops latching the output levels of the respective preceding stages in synchronism with the clock signal generated by said clock generating means and outputting second signals responsive to a second predetermined level of the latched levels;

whereby, when the number of said flip flops is one, the output signal of the flip flop is outputted as said clock resuming signal, and when the number of said flip flops is two or more, the clock resuming signal is outputted responsive to the first and second predetermined levels of the output signals of all the flip flops.

17. A semiconductor integrated circuit, being provided with:

a digital circuit which operates in synchronism with a clock signal;

a plurality of input terminals for inputting external signals respectively; and a clock generating circuit which supplies the clock signal to said digital circuit, comprising:

logical summing means for outputting a logical sum signal when one of the external signals is inputted from either of said plurality of input terminals;

signal generating means for receiving a first value when a signal is received from said digital circuit, and a second value when one of the external signals is inputted to said input terminal so as to output a clock stop control signal having a first signal level when receiving said first value, and to output the clock stop control signal having a second signal level when receiving said second value;

clock generating means, including:
oscillating means for oscillating clocks; and
controlling means for, which receives said clock stop control signal via a gating means, controlling said oscillation means to stop generation of said clock signal when said clock stop control signal is at the first signal level, and for controlling the same to start the generation of the clock signal when said clock stop control signal is at the second signal level;

the gating means for, when the logical sum signal is outputted from said logical summing means, outputting said clock stop control signal outputted from said signal generating means at the second signal level, and input to said controlling means in said clock generating means; and a plurality of sampling means for, each which is connected to respective said input terminals sampling the external signal inputted to each input terminal and received therefrom, respectively, in synchronism with the clock signal generated by said clock generating means respectively;

wherein when the logical sum signal is outputted from said logical summing means, said clock generating means starts to generate the clock signal responsive to the clock stop control signal having the second signal level being transmitted to said controlling means from said gating means.

wherein each said sampling means starts to sample the external signal inputted to the input terminal to which each said sampling means is connected responsive to said clock generating means starting to generate the clock signal, and outputs a clock resuming signal when a predetermined number of sampling results having predetermined levels are continuously sampled, and wherein said signal generating means receives said second value and outputs the clock stop control signal having the second signal level when the clock resuming signal is outputted from either of said sampling means to said signal generating means.

18. A clock generating circuit as set forth in claim 17, wherein said sampling means, having:

one or a plurality of cascade-connected flip flops, in which at least first stage flip flop latching the level of the external signal inputted to the input terminal connected thereto is synchronism with the clock signal generated by said clock generating means and outputting a first signal responsive to a first predetermined level of the latched level; and second and following stage flip flops latching the output levels of the respective preceding stages in synchronism with the clock signal generated by said clock generating means and outputting second signals responsive to a second predetermined level of the latched levels;

whereby, when the number of said flip flops is one, the output signal of the flip flop is outputted as said clock resuming signal, and when the number of said flip flops is two or more, the clock resuming signal is outputted responsive to the first and second predetermined levels of the output signals of all the flip flops.

* * * * *